US009806912B2

(12) United States Patent
Barbu et al.

(10) Patent No.: US 9,806,912 B2
(45) Date of Patent: Oct. 31, 2017

(54) METHODS AND DEVICES FOR CHANNEL ESTIMATION AND OFDM RECEIVER

(71) Applicant: Intel IP Corporation, Santa Clara, CA (US)

(72) Inventors: Oana-Elena Barbu, Aalborg (DK); Carles Navarro-Manchon, Aalborg (DK); Guillaume Monghal, Aalborg (DK); Bernard H. Fleury, Aalborg (DK); Christian Rom, Norresundby (DK)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/692,267

(22) Filed: Apr. 21, 2015

(65) Prior Publication Data

US 2016/0315791 A1    Oct. 27, 2016

(30) Foreign Application Priority Data

Jun. 5, 2014  (DE) ........................ 10 2014 008 347

(51) Int. Cl.
*H04L 25/02* (2006.01)
*H04L 27/26* (2006.01)

(52) U.S. Cl.
CPC ...... *H04L 25/0202* (2013.01); *H04L 27/2647* (2013.01)

(58) Field of Classification Search
CPC ........... H04B 1/10; H04B 1/16; H04L 25/022; H04L 25/0224; H04L 25/03159; H04L 27/2647
See application file for complete search history.

(56) References Cited

U.S. PATENT DOCUMENTS

| 2010/0183104 A1* | 7/2010 | Alexander ............ H04L 25/022 375/346 |
| 2014/0334530 A1* | 11/2014 | Thompson .......... H04L 25/0212 375/232 |

FOREIGN PATENT DOCUMENTS

| TW | I291817 B | 12/2007 |
| TW | 201110624 A | 3/2011 |

OTHER PUBLICATIONS

Prasad et al., Joint Approximately Sparse Channel Estimation and Data Detection in OFDM Systems using Sparse Bayesian Learning, IEEE Transactions on Siganl Processing, vol. 62, No. 14, Jul. 15, 204, pp. 3591-3603.*

(Continued)

*Primary Examiner* — Freshteh N Aghdam
(74) *Attorney, Agent, or Firm* — Schiff Hardin LLP

(57) ABSTRACT

A method (200) for channel estimation includes receiving (201) a receive symbol (206) comprising: a plurality of interfering transmissions from: a first transmit symbol (202), the first transmit symbol (202) comprising a plurality of unknown modulated symbols interleaved with a plurality of known modulated symbols and a second transmit symbol (204), the second transmit symbol (204) comprising a plurality of unknown modulated symbols interleaved with a plurality of known modulated symbols, wherein the plurality of transmissions from the first transmit symbol (202) and the second transmit symbol (204) are a plurality of transmissions of different time instances; and estimating (203) a channel based on the receive symbol (206) and a plurality of estimates of the first transmit symbol (202) and the second transmit symbol (204).

21 Claims, 12 Drawing Sheets

(56) References Cited

OTHER PUBLICATIONS

Riegler et al., Merging Belief Propagation and the Mean Field Approximation: A Free Energy Approach, IEEE Transcations on Information Theory, vol. 59, No. 1, Jan. 2013, pp. 588-602.*
Kirkelund, et al., "Variational Message-Passing for Joint Channel Estimation and Decoding in MIMO-OFDM", 6 pgs., IEEE Communications Society, 2010.
Kyosti, et al., "IST-4-027756 Winner II Channel Models", pp. 13-206, Information Society, 2007.
Li, et al., "Robust Channel Estimation for OFDM Systems With Rapid Dispersive Fading Channels", pp. 902-915; IEEE Transactions on Communications, 1998.
Pedersen, et al., "Application of Bayesian Hierarchical Prior MOdeling to Sparse Channel Estimation", pp. 3487-3492, IEEE ICC Signal Processing for Communications Symposium, 2012.
Prieto del Amo, et al., "Iterative Joint Estimation Procedure for Channel and Frequency Offset in Multi-Antenna OFDM Systems With an Insufficient Cyclic Prefix", pp. 3653-3662, IEEE Transactions on Vehicular Technology, vol. 62, No. 8, Oct. 2013.
Riegler, et al., "Merging Belief Propagation and the Mean Field Approximation: A Free Entergy Approach", pp. 588-602, IEEE Transactions on Information Theory, vol. 59, No. 1, Jan. 2013.
Xing, et al., "A Generalized Mean Field Algorithm for Variational Inference in Exponential Families", 9 pgs., Computer Science Division, University of California.
Office Action dated May 18, 2016 for Taiwanese Patent Application No. 104112403.

* cited by examiner

METHODS AND DEVICES FOR CHANNEL ESTIMATION AND OFDM RECEIVER

TECHNICAL FIELD

The present disclosure described herein generally relates to methods and devices for channel estimation. In particular, aspects of the present disclosure may relate to methods and devices for estimating a channel based on a receive symbol comprising interfering transmission from a first and a second transmit symbol. Further aspects relate to OFDM (Orthogonal Frequency Division Multiplex) receivers.

BACKGROUND

In many outdoor scenarios, the wireless multipath channel exhibits multipath components whose delays are longer than the Cyclic Prefix (CP) used in multi-carrier systems such as orthogonal frequency-division multiplexing (OFDM). The aforementioned system will be referred to as an "insufficient CP system". In insufficient CP systems, the multipath components with delays longer than the CP lead to two types of interference, namely Inter-Symbol Interference (ISI) and Inter-Carrier Interference (ICI). This means that the samples of the current symbol are interfered by samples of the previous symbol (ISI), but they also exhibit self-interference, i.e. each subcarrier leaks power on the adjacent subcarriers (ICI). ISI and ICI corrupt the transmitted signal and therefore affect the performance of pilot-based channel estimators, e.g. such as used in LTE systems and also that of the equalization. Since the pilots used for channel estimation become corrupted by interference, the original set of pilots becomes insufficient to accurately resolve the channel multipath components. Since data subcarriers exhibit interference from adjacent subcarriers and also from delayed previous symbols, traditional equalizers unaware of these effects become highly error-prone.

It may be desirable to improve channel estimation in wireless communication networks, in particular in insufficient CP systems.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DESCRIPTION

Figure 1:
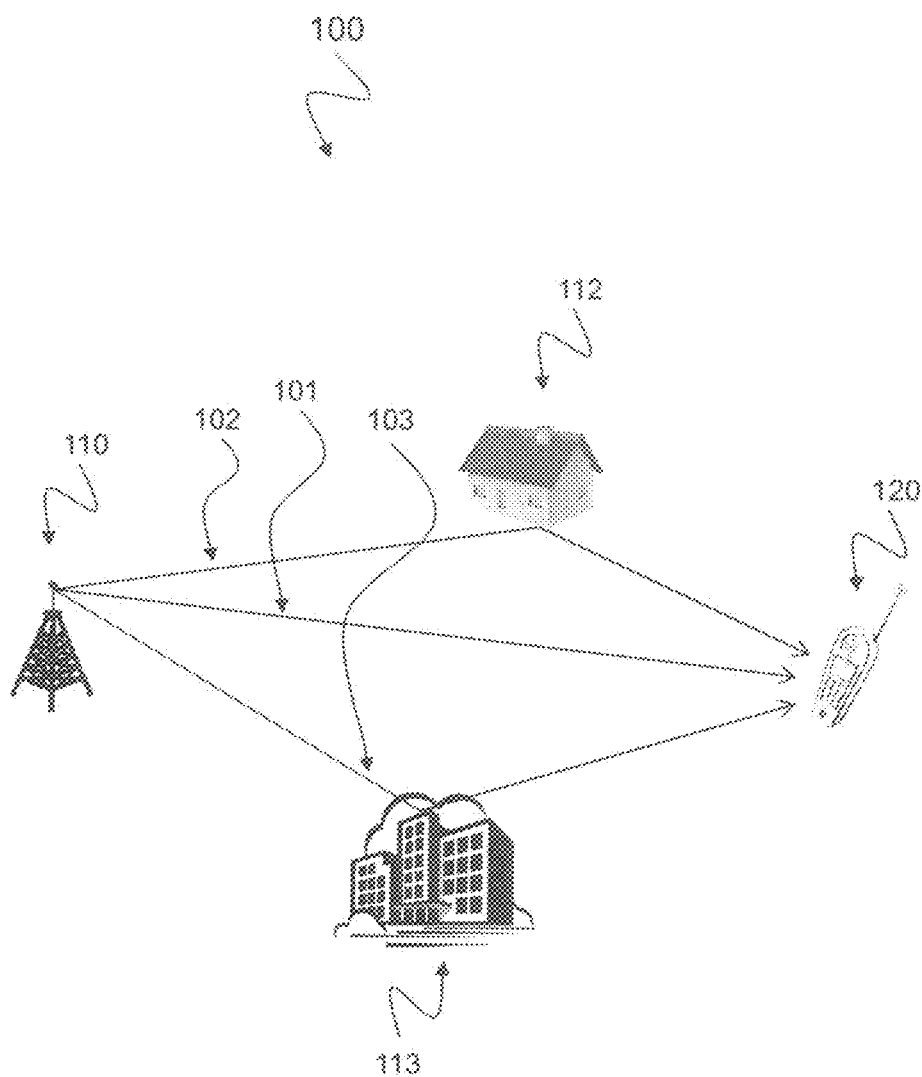
FIG. 1 is a schematic diagram illustrating a wireless system 100 including a base station 110 and a mobile station 120, the mobile station 120 applying techniques for channel estimation.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims. The following terms, abbreviations and notations will be used herein:

OFDM: Orthogonal Frequency Division Multiplex,
PACE: Pilot Aided Channel Estimation,
LTE: Long Term Evolution,
CRS: Cell-specific Reference Signal,
TX: Transmit,
RX: Receive,
IDFT: Inverse Discrete Fourier Transform,
DFT: Discrete Fourier Transform,
CP: Cyclic Prefix,
SNR: Signal to Noise Ratio,
MSE: Mean Squared Error,
MMSE: Minimum Mean Square Error,
MF: Mean Field,
MFBP: Mean Field Belief Propagation,
BER: Bit Error Rate,
CIR: Channel Impulse Response,
ISI: Inter-Symbol Interference,
ICI: Inter-Carrier Interference,
AWGN: Additive White Gaussian Noise,
RF: Radio Frequency,
UE: User Equipment,
LLR: Logarithmic Likelihood Ratio,
RWF: Robust Wiener Filter, SBL: Reference receiver using pilot-based time-domain channel estimation,
QPSK: Quadrature Phase Shift Keying,
P: Power,
r.v.: random variables,
pdf: probability density function.

REFERENCE SYMBOLS modulated symbols sent on specific subcarriers and at specific time instances (e.g. on specific OFDM symbols in an LTE system)—both their time-frequency positions and their values are known at reception.
Pilot Symbols:
same meaning as reference symbols, denoted hereinafter as $x_n^{(P)}$.
Data Symbols:
unknown at reception—need to be estimated, denoted hereinafter as $x_n^{(D)}$.
One Transmit Symbol:
denoted hereinafter as $x_n$, is the array of interleaved data and pilot symbols.
Insufficient CP System:
In a system with insufficient CP, the current receive signal $y_n$ suffers from ICI (from $x_n$) and ISI (from $x_{n-1}$, therefore both data and pilot symbols cause interference. In order to mitigate this, a data-aided time-domain channel estimation is performed, i.e. soft values of the CIR are estimated by using the known pilots $x_n^{(P)}$ and the soft estimates of the data $x_n^{(D)}$.

The methods and devices described herein may be based on channel estimation, in particular channel estimation of wireless multipath channels with multipath components whose delays are longer than the Cyclic Prefix. It is understood that comments made in connection with a described method may also hold true for a corresponding device configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on 3G, 4G and CDMA standards. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to about 300 GHz. The frequency range may correspond to frequencies of alternating current electrical signals used to produce and detect radio waves.

The methods and devices described herein may be implemented in radio receivers, e.g. time-domain receivers. A time-domain receiver is a radio receiver designed to counter the effects of multipath fading. This may be performed by using several "sub-receivers" called taps, paths or fingers, that is, several correlators each assigned to a different multipath component. Each tap or finger may independently decode a single multipath component. At a later stage, the contribution of all taps or fingers may be combined in order to make the most use of the different transmission characteristics of each transmission path. This may result in higher signal-to-noise ratio (SNR) in a multipath environment.

FIG. 1 depicts a wireless system 100 including a base station 110 and a mobile station 120, the mobile station 120 applying techniques for channel estimation as described in the following. The multipath channel through which a radio wave transmits from a base station 110 to a mobile station 120 can be viewed as transmitting the original (line-of-sight) wave pulse 101 through a number of multipath components 101, 102, 103 due to obstacles 112, 113. Multipath components are delayed copies of the original transmitted wave traveling through a different echo path, each with a different magnitude and time-of-arrival at the receiver. Since each component contains the original information, if the magnitude and time-of-arrival (phase) of each component is computed at the receiver through a process called channel estimation, then all the components can be added coherently to improve the information reliability. The delay of for example the third multipath component 103 depicted in FIG. 1 may be longer than the Cyclic Prefix used for signal transmission. When the mobile station 120 is implementing techniques for channel estimation as described in this disclosure, ISI and ICI can be detected and the mobile station 120 is able to accurately estimate the channel.

The methods and devices described herein may be implemented in multicarrier systems applying cyclic prefix and in wireless communication OFDM systems using CP. In a wireless communication OFDM system, the transmitted OFDM symbols may be generated by simultaneous data transmission over a set of orthogonal subcarriers. The OFDM symbols may then be sent over the wireless channel whose multipath nature determines multiple copies of the same symbol to arrive delayed at the receiver. This determines the previous symbols to interfere with the current one, i.e. giving rise to inter-symbol interference (ISI), but also destroys the orthogonality between subcarriers of the current OFDM symbol, i.e. creating inter-carrier interference (ICI). In order to avoid ISI and ICI, at transmission, the OFDM symbol may be prepended a cyclic prefix (CP), that may consist of a copy of its last samples, and whose length should be at least as long as the maximum excess delay of the channel. A long CP protects against ISI/ICI in a diverse range of scenarios, where the channels implicitly exhibit a wide range of maximum excess delay, but comes at the cost of reduced spectral efficiency. Long channels are the result of the heterogeneities in the propagation environment, e.g. hills, mountains, large water masses or skyscrapers in the urban areas. Therefore, choosing an appropriate length for the CP is always a tradeoff. As a result, there are situations in which the CP is shorter than the channel maximum excess delay; in this case both ISI and ICI degrade the receiver's performance, otherwise unaware of these phenomena. The degradation is the combined result of two different effects, i.e. pilot-based channel estimation errors and equalization impaired by ISI/ICI. The causes of the pilot-based channel estimation errors are two-fold: on one hand, in an insufficient CP OFDM system, the resolution the pilots provide is insufficient for the estimator to accurately resolve the channel response; on the other hand, since the channel estimators assume no power leakage between adjacent subcarriers, they employ a biased signal model in which, the transmitted symbols' vector is modulated by a diagonal channel matrix. Secondly, the equalization becomes biased due to the use of the mismatched signal model and the inaccurate channel estimates resolved by the channel estimation block prior to equalization.

Figure 2:
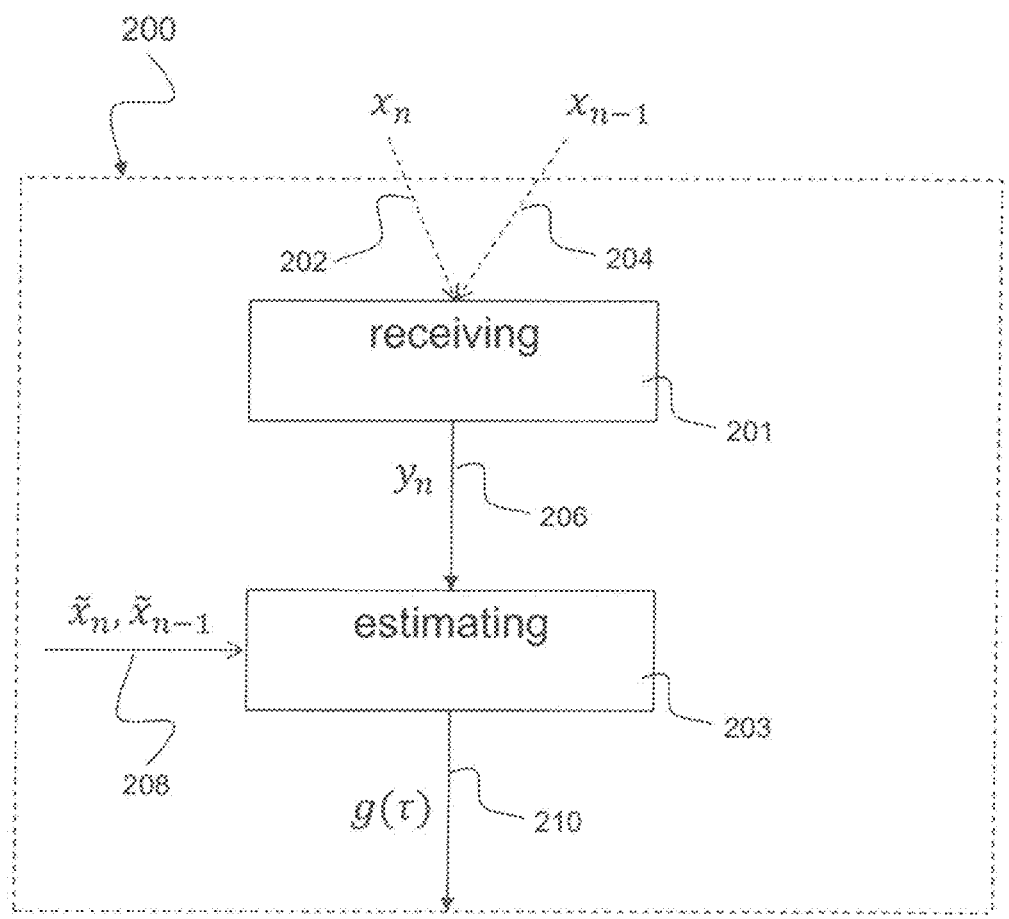
FIG. 2 is a schematic diagram of a method 200 for channel estimation in accordance with the disclosure.

FIG. 2 is a schematic diagram of a method 200 for channel estimation in accordance with the disclosure. The method 200 comprises receiving 201 a receive symbol $y_n$ 206 comprising interfering transmissions from a first transmit symbol $x_n$ 202 and a second transmit symbol $x_{n-1}$ 204, wherein the transmissions from the first transmit symbol $x_n$ 202 and the second transmit symbol $x_{n-1}$ 204 are transmissions of different time instances n, n−1. Each of the first transmit symbol $x_n$ 202 and the second transmit symbol $x_{n-1}$ 204 may include unknown modulated symbols interleaved with known modulated symbols. A transmit symbol may be an array of unknown modulated symbols such as data intended for the receiver interleaved with known modulated symbols such as pilots or reference symbols, e.g. cell-specific reference symbols (CRS) of an LTE frame. The method 200 further comprises estimating 203 a channel $g(\tau)$ 210 based on the receive symbol $y_n$ 206 and estimates 208 of the first transmit symbol $x_n$ 202 and the second transmit symbol $x_{n-1}$ 204.

The known modulated symbols of the first and second transmit symbols $x_n$ 202 and $x_{n-1}$ 204 may comprise cell-specific reference symbols (CRS) of an LTE frame. The first and second transmit symbols $x_n$ 202 and $x_{n-1}$ 204 may be part of an LTE frame, sub-frame or slot comprising data and/or control symbols in addition to the reference symbols. The cell-specific reference symbols of an LTE frame may also be denoted as pilot symbols or pilot OFDM symbols. The different time instances n, n−1 may be times at which the first transmit symbol $x_n$ 202 and the second transmit symbol $x_{n-1}$ 204 are transmitted at a transmitter. The different time instances n, n−1 may be different symbol times of an LTE frame, sub-frame or slot. For example, the transmission time n of the first transmit symbol $x_n$ 202 and the transmission time n−1 of the second transmit symbol $x_{n-1}$ 204 may be times of succeeding LTE frames or sub-frames or slots or may be times of succeeding symbols in an LTE frame, sub-frame or slot.

The receive symbol $y_n$ 206 may comprise inter-symbol interference and/or inter-carrier interference from the transmission of the first transmit symbol $x_n$ 202 and the transmission of the second transmit symbol $x_{n-1}$ 204. The method 200 may further comprise equalizing the receive symbol $y_n$ 206 by using the estimated channel $g(\tau)$ 210. The transmissions from the first transmit symbol $x_n$ 202 and the second transmit symbol $x_{n-1}$ 204 may be transmissions of subsequent time instances n, n−1. The first transmit symbol $x_n$ 202 and the second transmit symbol $x_{n-1}$ 204 may comprise OFDM symbols. A duration of a cyclic prefix of the OFDM symbols may be shorter than a delay of the channel. Estimating 203 the channel may be based on time-domain data-aided channel estimation. Estimating the channel may be based on a signal representation comprising a dictionary matrix $A_{n,n-1}$ comprising the first transmit symbol $x_n$ 202 and the second transmit symbol $x_{n-1}$ 204. The signal representation may be based on a sparse channel model having only a few non-negligible multi-path components. The signal representation may be based on probabilistic modeling of the channel and noise. The signal representation may be according to $y_n = A_{n,n-1}\beta + \epsilon_n$, where $y_n$ denotes the receive symbol at time instance n, $A_{n,n-1}$ denotes the dictionary matrix, $\beta$ denotes time-domain weights of the channel and $\epsilon_n$ denotes a noise power. The method 200 may comprise jointly estimating the channel and the first and second transmit symbols $x_n$ 202, $x_{n-1}$ 204 by applying the signal representation. The jointly estimating the channel and the first and second transmit symbols $x_n$ 202, $x_{n-1}$ 204 may be based on a mean field belief propagation framework as described below with respect to FIG. 5.

There are different methods for estimating 203 the channel $g(\tau)$ 210 based on the receive symbol $y_n$ 206 and estimates 208 of the first transmit symbol $x_n$ 202 and the second transmit symbol $x_{n-1}$ 204 as described in the following. In order to jointly estimate the variables of interest, i.e. channel complex weights, noise variance, data symbols, variational inference approaches may be used and the posterior pdfs of the unknown quantities, given the set of observations may be computed. For example, a Belief Propagation (BP) algorithm as described by J. Pearl in "Probabilistic Reasoning in Intelligent Systems: Networks of Plausible Inference, Morgan Kaufmann Publishers, Inc., 1988" may be employed to resolve the unknown random variables, abbreviated as r.v. of the system. The BP algorithm yields good approximations of the marginal distributions of the hidden variables also called beliefs. To reduce complexity, approximations in the computations of the beliefs may be applied. The computations associated with the continuous random variables updates may employ the Mean Field (MF) approximation as described by E. P. Xing, M. I. Jordan, and S. J. Russell in "A Generalized Mean Field Algorithm for Variational Inference in Exponential Families," CoRR, vol. abs/1212.2512, 2012. The MF algorithm outputs the approximate pdfs of the hidden random variables of interest by assuming the global pdf is fully factorizable; the solution of the method is the pdf which minimizes the Kullback-Liebler divergence between the approximated and the true pdf. Since both MF and BP have an iterative nature, similar to message exchanges between nodes of a factor graph, the joint framework [28] may be formulated as a message-passing algorithm according to E. Riegler, G. Kirkelund, C. Manchon, M. Badiu, and B. Fleury, "Merging Belief Propagation and the Mean Field Approximation: A Free Energy Approach," IEEE Transactions on Information Theory vol. 59, no. 1, pp. 588-602, 2013.

The estimating 203 the channel $g(\tau)$ may be based on a message-passing design optimized for insufficient CP OFDM systems using the unified MF-BP framework. In order to perform time-domain channel estimation, the CIR may be considered as being sparse, i.e. having a few non-zero multipath components. Making use of this finding, the estimating 203 may use compressive sensing techniques, which consist on finding sparse CIR estimates which maximize an objective function, for example based on l1-norm constrained minimization problems, such as Least Absolute Shrinkage and Selection Operator (LASSO), Basis Pursuit (BP), Orthogonal Matching Pursuit (OMP) or maximum-a-posteriori (MAP) methods such as sparse Bayesian learning (SBL) which uses a probabilistic modeling of the channel weights that encourages sparse CIR representations. For tractability purposes, these pdfs may be modeled by introducing hyperpriors over the weights, and thus obtaining two- (2L) or three-layers (3L) hierarchical models.

Estimating 203 the channel $g(\tau)$ may be based on a message-passing iterative receiver design technique as described below with respect to FIG. 5 which overcomes the effects of ISI/ICI caused by insufficient CP. The described receiver techniques may employ time-domain channel estimating accounting for the CIR sparsity, by using an SBL approach, for example using a 2L hierarchical modeling of the channel weights. Furthermore, using iterative receiver designs allows using the previously estimated noise variance and the soft decoded symbols as virtual pilots in order to refine the channel estimates. In order to rebuild the symbols fed back to the estimating 203 block, the outputs of the interleaving and decoding blocks as described below with respect to FIG. 5 may be processed every iteration.

The method 200 as described herein may be implemented in a processing circuit 300 as described below with respect to FIG. 3. The method 200 as described herein may be implemented in an OFDM receiver 400 as described below with respect to FIG. 4 or in a receiver 500 as described below with respect to FIG. 5.

Figure 3:
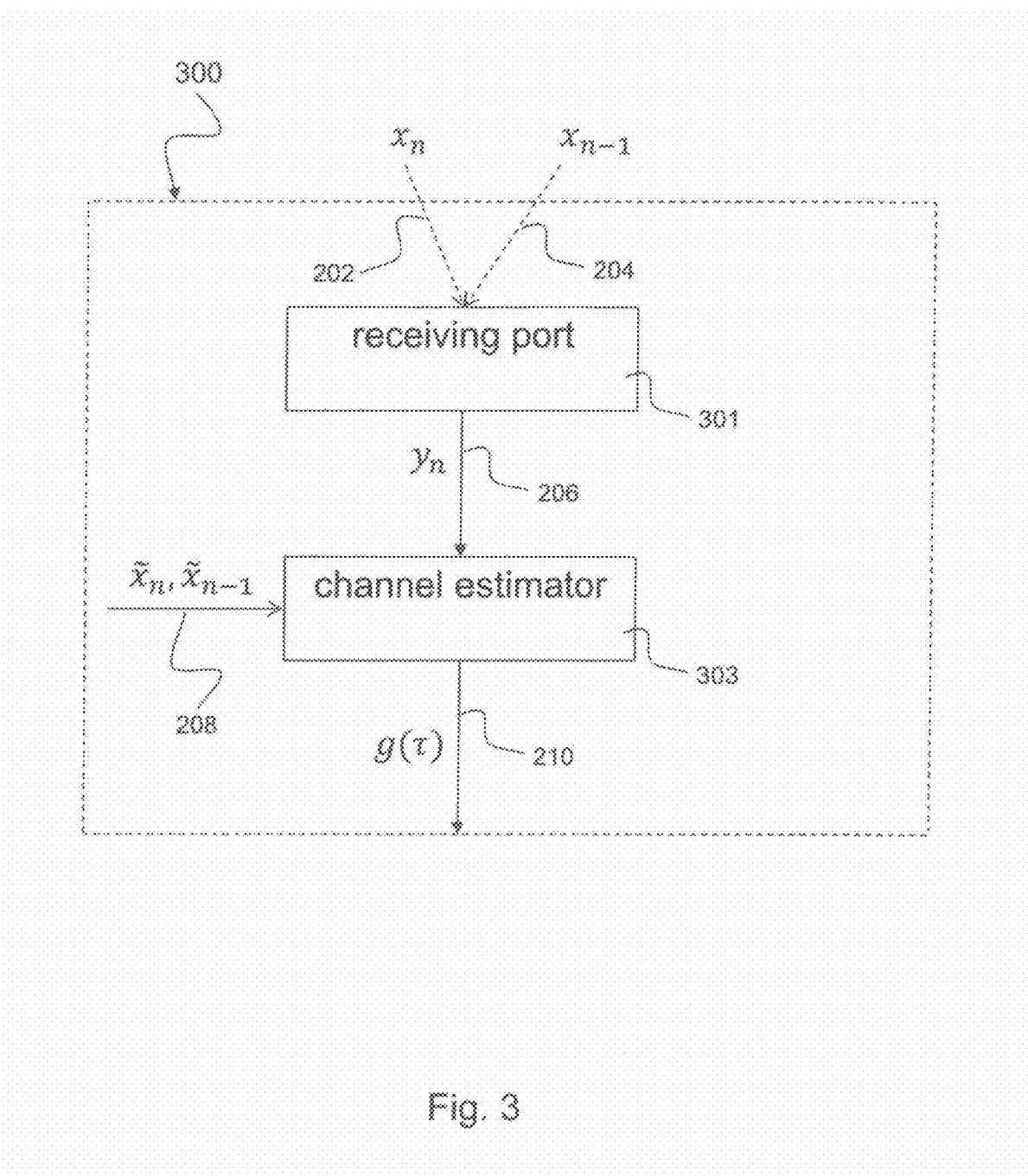
FIG. 3 is a schematic diagram of a processing circuit 300 in accordance with the disclosure the processing circuit including a receiving port 301 and a channel estimator 303.

FIG. 3 is a schematic diagram of a processing circuit 300 in accordance with the disclosure the processing circuit including a receiving port 301 and a channel estimator 303. The receiving port 301 is configured to receive a receive symbol $y_n$ 206 comprising interfering transmissions from a first transmit symbol $x_n$ 202 and a second transmit symbol $x_{n-1}$ 204. The transmissions from the first transmit symbol $x_n$ 202 and the second transmit symbol $x_{n-1}$ 204 are transmissions of different time instances n, n−1. Each of the first transmit symbol $x_n$ 202 and the second transmit symbol $x_{n-1}$ 204 may include unknown modulated symbols interleaved with known modulated symbols as described above with respect to FIG. 2. A transmit symbol may be an array of unknown modulated symbols such as data intended for the receiver interleaved with known modulated symbols such as pilots or reference symbols, e.g. cell-specific reference symbols (CRS) of an LTE frame. The channel estimator 303 is configured to estimate a channel $g(\tau)$ 210 based on the receive symbol $y_n$ 206 and estimates of the first transmit symbol $x_n$ 202 and the second transmit symbol $x_{n-1}$ 204.

The receive symbol $y_n$ 206 may comprises an OFDM symbol. The processing circuit 300 may further comprise a pre-processing unit, e.g. as described below with respect to FIG. 5 configured to remove a cyclic prefix and to apply a Fourier transform to the receive symbol $y_n$ 206. The processing circuit 300 may further comprise an equalizer, e.g. as described below with respect to FIGS. 4 and 5 configured to equalize the receive symbol $y_n$ 206 by using the estimated channel $g(\tau)$ 210. The channel estimator 303 may be configured to compute soft estimates of the channel $g(\tau)$ 210 and soft estimates of a noise variance based on a Bayesian interference technique, e.g. as described below with respect to FIG. 5. The equalizer may be configured to compute soft estimates 208 of the first transmit symbol $x_n$ 202 and the second transmit symbol $x_{n-1}$ 204 based on the soft estimates of the channel and the noise variance, e.g. as described below with respect to FIGS. 4 and 5. The channel estimator 303 may be configured to estimate the channel $g(\tau)$ 210 based on a signal representation comprising a dictionary matrix $A_{n,n-1}$, e.g. as described below with respect to FIG. 5 wherein the dictionary matrix may comprise the first transmit symbol $x_n$ 202 and the second transmit symbol $x_{n-1}$ 204. The channel estimator 303 may be configured to compute the dictionary matrix $A_{n,n-1}$ based on the estimates 208 of the first transmit symbol $x_n$ 202 and the second transmit symbol $x_{n-1}$ 204.

Figure 4:
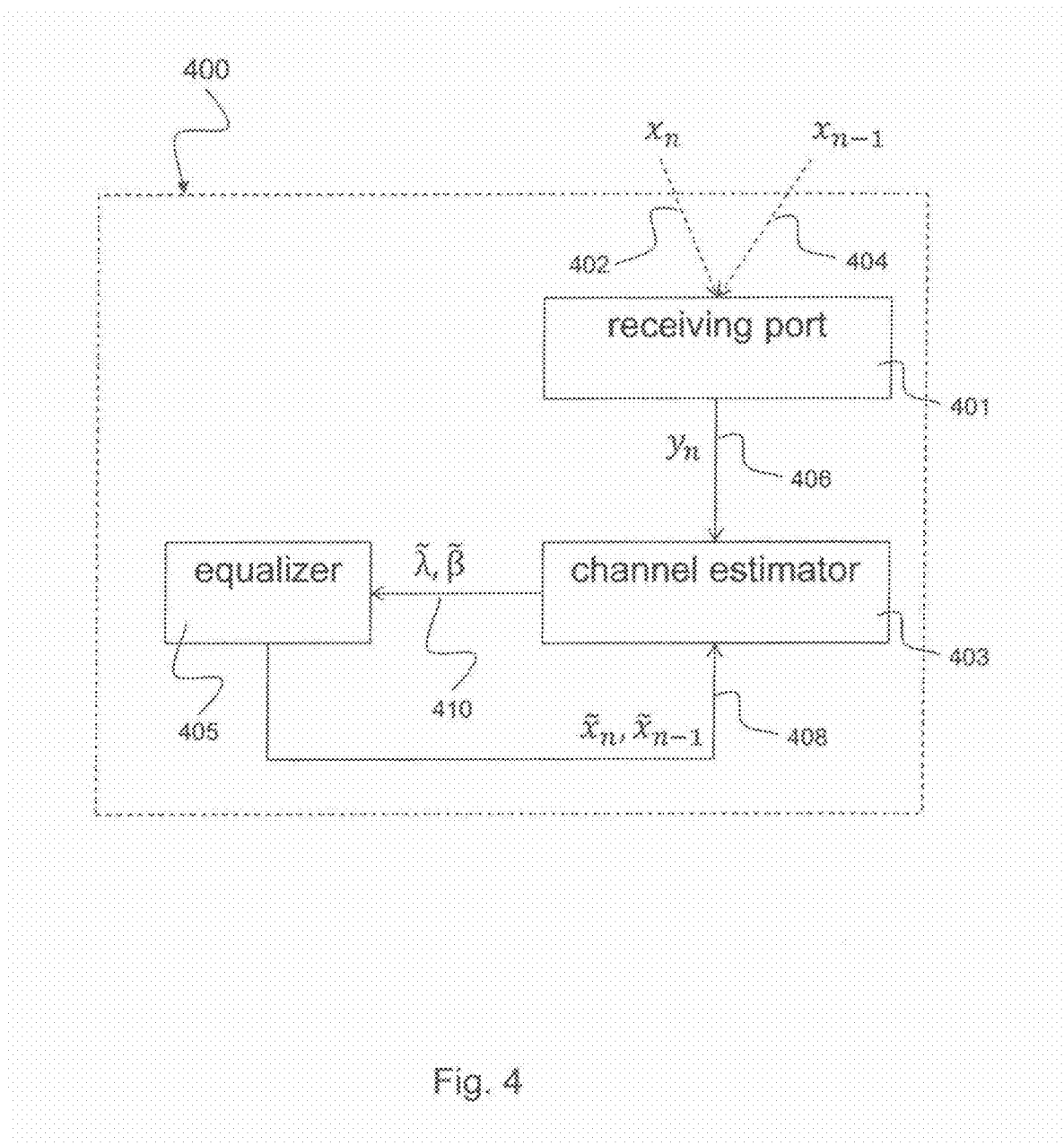
FIG. 4 is a schematic diagram of an OFDM receiver 400 in accordance with the disclosure the OFDM receiver including a receiving port 401, a channel estimator 403 and an equalizer 405.

FIG. 4 is a schematic diagram of an OFDM receiver 400 in accordance with the disclosure the OFDM receiver including a receiving port 401, a channel estimator 403 and an equalizer 405. The OFDM receiver 400 comprises a receiving port 401 configured to receive a receive OFDM symbol $y_n$ 406 comprising interfering transmissions from a first OFDM symbol $x_n$ 402 and a second OFDM symbol $x_{n-1}$ 404, wherein the transmissions from the first OFDM symbol $x_n$ 402 and the second OFDM symbol $x_{n-1}$ 404 are transmissions of different time instances n, n−1. Each of the first OFDM symbol $x_n$ 402 and the second OFDM symbol $x_{n-1}$ 404 may include unknown modulated symbols interleaved with known modulated symbols. An OFDM symbol may be an array of unknown modulated symbols such as data intended for the receiver interleaved with known modulated symbols such as pilots or reference symbols, e.g. cell-specific reference symbols (CRS) of an LTE frame. In particular, not only pilots interfere with each other, but also data sent on adjacent subcarriers leaks energy on the pilots. The OFDM receiver 400 further comprises a channel estimator 403 configured to estimate soft estimates $\tilde{\lambda}, \hat{\beta}$ 410 of a channel impulse response $\beta$ and of a noise power $\epsilon_n$ based on the receive OFDM symbol $y_n$ 406 and based on soft estimates $\tilde{x}_n, \tilde{x}_{n-1}$ 408 of the first OFDM symbol $x_n$ 402 and the second OFDM symbol $x_{n-1}$ 404. The OFDM receiver 400 further comprises an equalizer 405 configured to estimate the soft estimates $\tilde{x}_n, \tilde{x}_{n-1}$ 408 of the first OFDM symbol $x_n$ 402 and the second OFDM symbol $x_{n-1}$ 404 based on the soft estimates $\tilde{\lambda}, \hat{\beta}$ 410 of the channel impulse response $\beta$ and of the noise power $\epsilon_n$ estimated by the channel estimator 403.

The channel estimator 403 may be configured to estimate the soft estimates $\tilde{\lambda}, \hat{\beta}$ 410 of the channel $\beta$ based on a signal representation comprising a dictionary matrix $A_{n,n-1}$, e.g. as described below with respect to FIG. 5 wherein the dictionary matrix comprises the first OFDM symbol $x_n$ 402 and the second OFDM symbol $x_{n-1}$ 404. The signal representation may be according to $y_n = A_{n,n-1}\beta + \epsilon_n$, where $y_n$ denotes the receive symbol at time instance n, $A_{n,n-1}$ denotes the dictionary matrix, $\beta$ denotes soft estimates of the time-domain weights of the channel and $\epsilon_n$ denotes a soft estimate of a noise power. The equalizer 405 may be configured to estimate a first matrix H representing an estimated impulse response of the channel, a second matrix $H_{ISI}$ representing an estimated inter-symbol interference and a third matrix $H_{ICI}$ representing an estimated inter-carrier interference, e.g. as described in the following.

A transceiver chain in which the n-th OFDM symbol sent over N subcarriers may be denoted as $s_n = F^H x_n$, where $x_n$ is the modulated messages to be sent:

$$x_n = [x_n(0), \ldots, x_n(N-1)] \quad (A1)$$

Next, the signal is appended the CP and is sent over the wireless channel, considered invariant during one LTE subframe (1 ms):

$$g(\tau) = \sum_{l=0}^{L-1} \beta(l)\delta(\tau - \tau_l)$$

According to a traditional signal model when the maximum excess delay $\tau_{L-1}$ is smaller or equal to the CP length, the signal after the DFT processing corresponding to the n-th received OFDM symbol may be written as:

$$y_n = Hx_n + \epsilon_n \quad (A2)$$

where H is a diagonal matrix containing the channel frequency response, and $\epsilon_n$ is AWGN with zero mean and covariance $\lambda^{-1} I$.

The OFDM receiver 400 uses an enhanced signal model as described in the following. When the CIR length is longer than the CP length, the n-th received OFDM symbol is affected by interference:

$$y_n = (H - H_{ICI})x_n + H_{ISI}x_{n-1} + \epsilon_n \quad (A3)$$

This enables the OFDM receiver 400 to perform interference cancellation both when estimating the channel and the data. Furthermore, re-writing (A3), results in an equivalent model which explicitly contains the channel weights β:

$$y_n = A_{n,n-1}\beta + \epsilon_n \quad (A4)$$

where $A_{n,n-1}$ is a full matrix containing $x_n$ and $x_{n-1}$. In the following this matrix will be designated as the dictionary or dictionary matrix for the model (A4). The OFDM receiver 400 uses equation (A4) and a probabilistic modeling of the channel and the noise to obtain accurate estimates of the time-domain channel weights β and of the noise power.

By using the signal model or signal representation according to equation (A4) the OFDM receiver 400 is able to cancel the ICI and ISI which occur in a system with insufficient CP. Hence, the OFDM receiver 400 is able to make the distinction between interference and noise. The OFDM receiver 400 is able to operate with the resolution as given by the observation array. Therefore, the OFDM receiver 400 provides high performance, as shown below with respect to FIGS. 8 to 11.

The OFDM receiver 400 may perform time-domain data-aided channel estimation considering ICI and ISI. The OFDM receiver 400 may perform channel estimation by modeling the channel as a sparse channel characterized by its sparse channel impulse response in the delay domain and by using sparse estimation techniques to estimate the channel. By using the time-domain estimates of the channel, the OFDM receiver 400 is able to model the ICI and ISI effects on the received signal and to cancel them. The OFDM receiver 400 may further accurately estimate the noise power. The OFDM receiver 400 may apply the model as derived in equation (A4) and an iterative method of estimating the channel, the noise and data by employing a probabilistic modeling of the variables of interest. In an implementation form, the OFDM receiver 400 may employ the control channels as an extra set of virtual pilots which may increase the number of available observations at the estimator side.

The OFDM receiver 400 may be operated according to the following. The receiving port 401 may receive as input a set of known data (e.g. pilots and known control channels data) and unknown data (e.g. other control channels which it decodes with high reliability and data channels that it soft-decodes iteratively while simultaneously updating the cir estimates); both types of data may be used as observations when the channel estimator 403 is performing channel estimation. The OFDM receiver 400 may employ a probabilistic modeling of the parameters of interest (e.g. the channel complex gains to be estimated, the AWGN and the ISI and ICI) and the model derived in equations (A3) and (A4). The OFDM receiver 400 may iteratively perform the following two main tasks of Time-Domain Channel Estimation mainly performed by the channel estimator 403 and Equalization and Decoding mainly performed by the equalizer 405. With respect to Time-Domain Channel Estimation, the channel estimator 403 may compute $A_{n,n-1}$ from equation (A4) using the current soft estimates of $x_n$, $x_{n-1}$ (denoted in FIG. 4 as $\tilde{x}_n$, $\tilde{x}_{n-1}$). The channel estimator 403 may then use a Bayesian inference technique to compute soft estimates of the CIR β and the noise variance $\lambda^{-1}$ (denoted in FIG. 4 as $\tilde{\beta}$ and respectively $\tilde{\lambda}^{-1}$). With respect to Equalization and Decoding, the equalizer 405 may compute $H-H_{ICI}$, $H_{ISI}$ from equation (A3) using the current soft estimates $\tilde{\beta}$. Using $H-H_{ICI}$, $H_{ISI}$ and the current noise soft estimate $\tilde{\lambda}^{-1}$, the equalizer 405 may compute $\tilde{x}_n$ ($\tilde{x}_{n-1}$). These estimates may be (optionally) refined by using a Soft-Input Soft-Output Channel Decoder and may be fed back to the time-domain channel estimator 403. The two main tasks of Time-Domain Channel Estimation and Equalization and Decoding may be repeated until convergence criteria are fulfilled.

The operation of the OFDM receiver 400 may be described by combining the following elements:

Using the model from (A4), in which the channel vector β is isolated from the other components of the system $x_n$, $x_{n-1}$ contained in the matrix $A_{n,n-1}$, enables the time-domain estimation of the channel and cancelling the effect of ISI and ICI at equalization.

Assuming the channel impulse response is sparse and applying sparse estimation techniques, in particular sparse Bayesian learning framework.

The only prior knowledge that may be needed for channel estimation may be the maximum excess delay.

Iteratively using the statistics of the estimated data to enhance the number of available observations for channel estimation. The estimated data becomes therefore a set of virtual pilots.

Using the soft estimates of the CIR and noise variance to refine the equalization and decoding.

The OFDM receiver 400 is an iterative receiver capable of coping with ISI/ICI due to insufficient CP in OFDM systems. The OFDM receiver 400 may perform a data-aided time-domain channel estimation, noise estimation, interference cancellation and data detection. The OFDM receiver 400 performs better than other receivers using a pilot-based approach, in terms of both accuracy of the channel estimates and obtained BER as shown below with respect to FIGS. 8 to 11.

Figure 5:
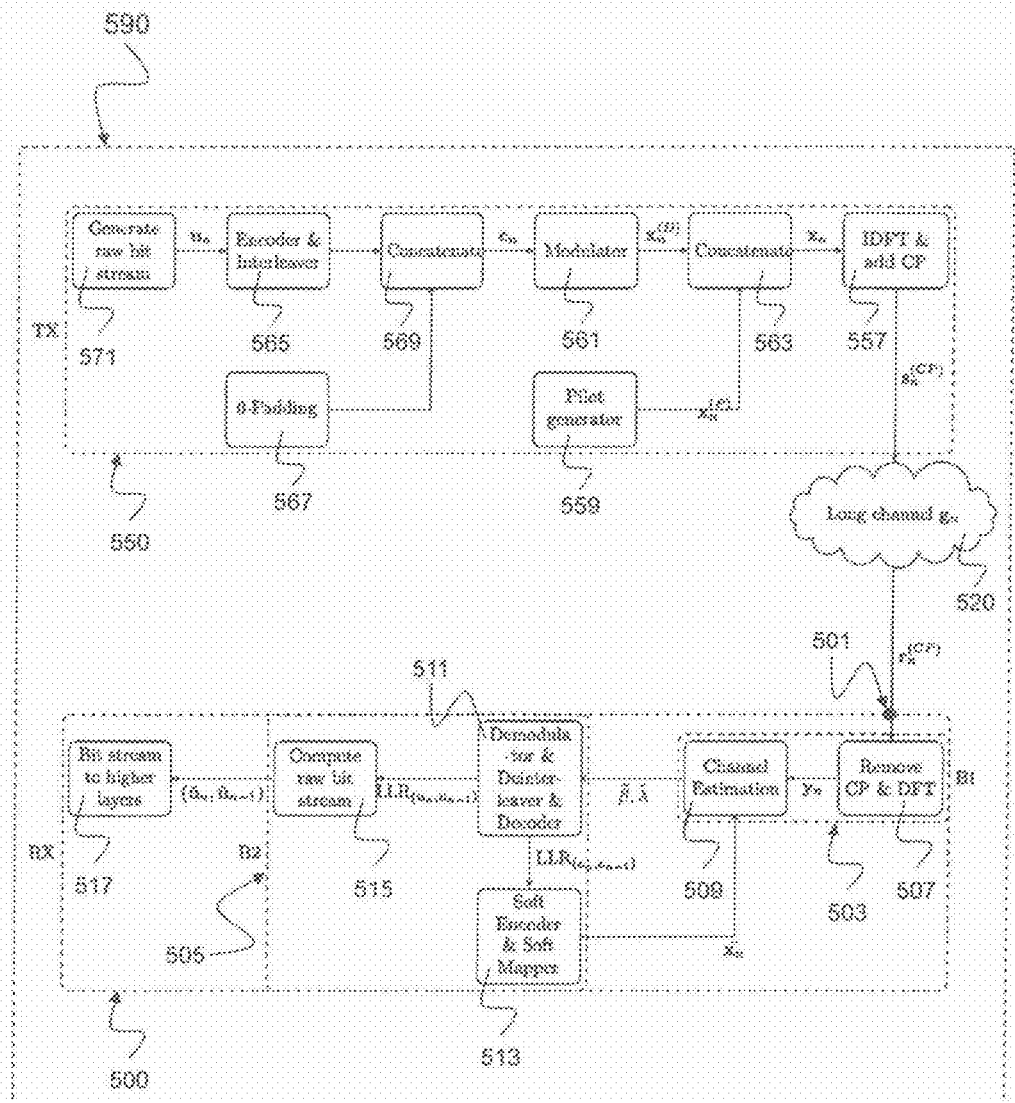
FIG. 5 is a schematic diagram of a transceiver system 590 in accordance with the disclosure the transceiver system including a transmitter 550 and a receiver 500.

FIG. 5 is a schematic diagram of a transceiver system 590 in accordance with the disclosure the transceiver system including a transmitter 550 and a receiver 500.

The transmitter 550 includes a transmission chain for processing a raw bit stream $u_n$ generated by a raw bit stream generation unit 571. The raw bit stream $u_n$ may be encoded and interleaved by an Encoder and Interleaver unit 565 and concatenated with a zero padding sequence generated by a 0-padding unit 567 by a concatenation unit 569 generating a concatenated symbols $c_n$. The concatenated symbols $c_n$ may be further concatenated with pilot symbols $x_n^{(P)}$ generated by a pilot generator 559 by a further concatenation unit 563 generating transmit symbols $x_n$. The transmit symbols $x_n$ may be transformed and a cyclic prefix CP may be added by using an IDFT and CP adding unit 557 which may generate the OFDM transmit symbols $s_n^{(CP)}$. These OFDM transmit symbols may be transmitted over a channel 520 that may be a long channel $g_n$, i.e. a channel having a long impulse response.

The receiver 500 may include a reception chain for processing OFDM receive symbols $r_n^{(CP)}$. The OFDM receive symbols $r_n^{(CP)}$ may be received at a receive port 501 in response to the OFDM transmit symbols $s_n^{(CP)}$ transmitted over the channel $g_n$ 520 which may be a channel having a long impulse response. A long impulse response may be defined as an impulse response which tap delays are longer than a cyclic prefix applied by the IDFT and CP adding unit 557.

The OFDM receive symbols $r_n^{(CP)}$ may be transformed and a cyclic prefix CP may be removed by an IDFT and CP removing unit 507 which may generate the receive symbols $y_n$. The receive symbols $y_n$ may be processed by a channel estimation unit 509 for estimating the channel $g_n$ 520 based on the receive symbol $y_n$ and estimates $\tilde{x}_n$, $\tilde{x}_{n-1}$ of a first transmit symbol $x_n$ and a second transmit symbol $x_{n-1}$ provided by an equalizer B2, 505. The IDFT and CP removing unit 507 together with the channel estimation unit 509 is referred herein as channel estimator B1, 503 and may correspond to the channel estimator 403 as described above with respect to FIG. 4 or to the channel estimator 303 as described above with respect to FIG. 3. The channel estimator 503 may provide estimates $\hat{\beta}$ of the channel and estimates $\hat{\lambda}$ of the noise to the equalizer B2, 505.

The equalizer 505 may include a demodulator, deinterleaver and decoder unit 511 providing LLR values of a first raw bit stream $u_n$ as generated by the raw bit stream generation unit 571 at time instance n and of a second raw bit stream $u_{n-1}$ as generated by the raw bit stream generation unit 571 at time instance n-1. The demodulator, deinterleaver and decoder unit 511 may further provide LLR values of a first concatenated symbol $c_n$ as generated by the concatenation unit 569 at time instance n and of a second concatenated symbol $c_{n-1}$ as generated by the concatenation unit 569 at time instance n-1.

The equalizer 505 may include a soft encoder and soft mapper unit 513 that may provide the estimates $\tilde{x}_n$, $\tilde{x}_{n-1}$ of the first transmit symbol $x_n$ and the second transmit symbol $x_{n-1}$ based on the LLR values of the first and second concatenated symbols $c_n$, $c_{n-1}$. The equalizer 505 may include a raw bit stream computation unit 515 that may generate estimates $\hat{u}_n$, $\hat{u}_{n-1}$ of the first and second raw bit streams $u_n$, $u_{n-1}$ based on the LLR values of the first and second raw bit streams $u_n$, $u_{n-1}$ as generated by the demodulator, deinterleaver and decoder unit 511. The estimates $\hat{u}_n$, $\hat{u}_{n-1}$ may be forwarded to higher layers by using a higher layer forwarding unit 517.

In the following, an implementation of the transceiver system 590 is described in detail. The following notation is applied: $|\mathcal{L}|$ is used to designate the cardinality of set $\mathcal{L}$; the notation [1:P] denotes the set $\{p \in \mathbb{N} | 1 \leq p \leq P\}$. A=diag (a) denotes the matrix with the entries of the vector a in its diagonal, while $A_{i,j}$ denotes the (i,j) element of the matrix A. The N×N discrete Fourier transform matrix (DFT) is defined as $$F \in \mathbb{C}^{N \times N}, F_{m,n} = 1/\sqrt{N} e^{-j2\pi mn/N}, \forall m,n \in [0:N-1].$$

A function $f$ which maps the set $\mathcal{E}$ to the set $\mathcal{F}$ is denoted as $f: \mathcal{E} \to \mathcal{F}$. The convolution of two functions f and g is denoted as $(f*g)$. The superscript $(.)^T$ designates transposition, while $(.)^H$ designates the Hermitian transposition. $\|.\|_2$ represents the Euclidian norm; $\delta(\cdot)$ is the Dirac delta function and I is the identity matrix. The notation $m \propto^e n$ is equivalent to $e^m = e^{c+n}$, where c is a constant. The operator $(\hat{\cdot})$ is used to designate the estimate of the variable of interest and $(\bar{\cdot})$ to designate the average value of the elements in a set. The concatenation of two matrices per row A, B is designated as [A|B]. CN(.|a,B) is a multivariate complex Gaussian pdf with mean vector a and covariance matrix B, while Ga(.; a, b) is the gamma pdf with shape and rate parameters a and respectively b. $\langle f(x) \rangle_{q(x)}$ is denoted as the expected value of f(x) with respect to the pdf q(x).

The system model as described in the following may be applied. A received signal model is presented in an OFDM system in which the channel exhibits delays longer than the CP, i.e. the received signal is corrupted by ISI and ICI. To this end, a single-input single-output OFDM system model is considered for which the following assumptions hold: (i) the channel is static during the transmission of one OFDM symbol, (ii) the delays of the multipath components are not aligned with the sampling grid, (iii) the channel impulse response consists of multipath components with delays longer than the CP duration. The current message is designated by employing the index n and it consists of a vector $u_n=[u_n(0), \ldots, u_n(K-1)]$ of information bits which are encoded with a code rate $R=K/N_DQ$ and interleaved into the vector $c_n = \mathcal{C}(u_n) c_n = [c_n^{(0)T}, \ldots, c_n^{(N_D-1)T}]$ where the entries of $c_n^{(d)}$ are $c_n^{(d)}(q)$, $\forall q \in [0:Q-1]$, $d \in [0:N_D-1]$, and $\mathcal{C}$ denotes the coding and interleaving function. The encoded message is then modulated onto the complex vector $x_n^{(D)}=[x_n^{(D)}(0), \ldots, x_n^{(D)}(N_D-1)]^T$, $x_n^{(D)}(d)=\mathcal{M}(c_n^{(d)})$, $\forall d \in [0:N_D-1]$, where M denotes the mapping function. The data symbols are interleaved with the pilot symbols from the vector $x_n^{(P)}=[x_n^{(P)}(0), \ldots, x_n^{(P)}(N_P-1)]^T$. The overall modulated message to be sent is then $[x_n(0), \ldots, x_n(N-1)]^T$ with the entries $x_{n,i}=x_n^{(P)}(j)$ if $(i \in \mathcal{P}, p_j=i)$ and $x_{n,i}=x_n^{(D)}(j)$, if $(i \in \mathcal{D}, d_j=i)$, $\mathcal{P}=\{p_{n,0}, \ldots, p_{n,N_P-1}\}$ and $\mathcal{D}=\{d_{n,0}, \ldots, d_{n,N_D-1}\}$ represent the subsets of pilot and respectively data indices so that $\mathcal{P} \cup \mathcal{D} = \{0, \ldots, N-1\}$, $\mathcal{P} \cap \mathcal{D} = \varnothing$, and $N=N_D+N_P$. The symbols are passed through an inverse DFT block, yielding the samples of the useful OFDM symbol $s_n=F^H x_n=[s_n(0), \ldots, s_n(N-1)]^T$, to which a μ-samples long cyclic prefix (CP) is appended, to obtain the samples of current OFDM symbol $[s_n(-\mu), \ldots, s_n(N-1)]^T$, $s_n(-i)=s_n(N-i)$, $i \in [0:N-1]$ which are modulated by a transmit pulse-shape filter $\psi_{tx}(t):[0,T] \to \mathbb{R}$ yielding the current OFDM symbol $$s_n(t) = \sum_{i=-\mu}^{N-1} s_n(i) \psi_{tx}(t - (i + n(\mu + N))T_s) \quad (1)$$

where $T_s$ represents the sampling time. Alternatively, we express $s_n(t)=(\tilde{s}_n * \psi_{tx})(t)$ where we define $\tilde{s}_n(t)=\Sigma_{i=-\mu}^{N-1} s_n(i) I_{\{(i+n(\mu+N))T_s\}}(t)$. We define $I_A(x)=1 \Longleftrightarrow x \in A$. The transmitted signal $s(t)=\Sigma_{n=-\infty}^{n=+\infty} s_n(t)$ is sent over the wireless channel that may be considered static over the duration of one OFDM symbol and whose channel impulse response (CIR) during the $n^{th}$ OFDM symbol exhibits $L_n$ multipath components, characterized by the complex gains $\beta_n=[\beta_n(0), \ldots, \beta_n(L_n-1)]^T$ and delays $\tau_n=[\tau_n(0), \ldots, \tau_n(L_n-1)]^T$. We consider the CIR consists of multipath components which arrive at the receiver with delays longer than the CP duration, therefore we expect that, at least $\tau_n(L_n-1) > \mu T_n$. We restrain however our analysis to a channel with a maximum excess delay no longer than the duration of the OFDM symbol, i.e. $\tau_n(L_n-1) \leq (\mu+N)T_n$. The CIR reads $$g(t, \tau) = \sum_{n=-\infty}^{n=+\infty} g_n(\tau) I_{[(n-1)\mu+nN)T_s, (n\mu+(n+1)N)T_s)}(t) \quad (2)$$

where $g_n(\tau)=\Sigma_{l=0}^{L_n-1} \beta_n(l) \delta(\tau-\tau_n(l))$. The received signal $\tilde{r}(t)=s(t)*g(t,\tau)=\Sigma_{n=-\infty}^{n=+\infty} \tilde{s}_n(t) * \psi_{tx}(t) * g(t,\tau)$ is demodulated by the receive filter $\psi_{rx}:[0,T] \to \mathbb{R}$ to yield the signal $r(t)=\tilde{r}(t)*\psi_{rx}(t)=\Sigma_{n=-\infty}^{n=+\infty} \tilde{s}_n(t) * g(t,\tau) * \phi(t)$, that we re-write as $$r(t) = \sum_{n=-\infty}^{n=+\infty} \sum_{m=-\infty}^{m=+\infty} \sum_{i=-\mu}^{N-1} s_m(i) \sum_{l=0}^{L_n-1} \beta_n(l) \phi(t - \tau_n(l) - (i + m(\mu + N))T_s) = \quad (3)$$

$$\sum_{n=-\infty}^{n=+\infty} r_n(t)$$

where $\phi(t)=(\psi_{tx}*\psi_{rx})(t):[0,2T]\to\mathbb{R}$ and $r_n(t)$ denotes the $n^{th}$ OFDM received signal. Since $\tau_n(L_n-1)\leq(\mu+N)T_s$, $\tau_n(t)$ contains the contributions of the $n^{th}$ and $n-1^{th}$ sent OFDM signals and reads $$r_n(t) = \sum_{i=-\mu}^{N-1} s_{n-1}(i) \sum_{l=0}^{L_n-1} \beta_n(l)\phi(t-\tau_n(l)-(i+(n-1)(\mu+N))T_s) + \quad (4)$$
$$\sum_{j=-\mu}^{N-1} s_n(j) \sum_{l=0}^{L_n-1} \beta_n(l)\phi(t-\tau_n(l)-(j+n(\mu+N))T_s)$$

The received signal (4) is next sampled at $(k+n(\mu+N))T_s$, $k\in[0:N-1]$ to yield the received vector $r_n=[r_n(0), \ldots, r_n(N-1)]^T$. We define the composite CIR during the $n^{th}$ OFDM symbol $q_n(\tau):[\tau_n(0), \tau_n(L_n-1)+2T]\to\mathbb{C}$ as $q_n(\tau)=\sum_{l=0}^{L_n-1}\beta_n(l)\phi(\tau-\tau_n(l))$; this enables us to express the entries of $r_n$ as $$r_n(k) = \sum_{i=-\mu}^{N-1} s_{n-1}(i)q_n((k-i+(\mu+N))T_s) + \sum_{j=-\mu}^{N-1} s_n(j)q_n((k-j)T_s). \quad (5)$$

The signal after DFT processing $y_n=Fr_n+\xi_n$, $\xi_n=Fv_n$, can be re-written as $$y_n = Hx_n + FCF^H x_n + FSF^H x_{n-1} + \xi_n \quad (6)$$

where the entries of H, C, $S\in\mathbb{C}^{N\times N}$ are $H_{m,i}=\sum_{u=0}^{M-1}\sqrt{N}q_n(vT_s)[F]_{m,x}I_{\{m\}}(i)$, $C_{m,i}=-q_n((N+m-i)T_s)I_{[0:E-1]}(m)I_{[m+(N-E-\mu):N-\mu-1]}(i)$, and $S_{m,i}=q_n((N+\mu+m-i)Ts)I_{[0:E-1]}(m)I_{[m+(N-E):N-1]}(i)$ respectively, $m,i\in[0:N-1]$ and $M=[(\tau_n(L_n-1)+2T)/T_s]$, $E=M-1-\mu$. We observe in (6) the explicit ICI and ISI effects on the received signal through the contributions of the matrices C, and S respectively; if the channel does not exhibit delays longer than the CP duration, then the ICI and ISI matrices become null and the model falls back to the traditional one.

We isolate next the channel vector $\beta_n$ in the signal model (6) and obtain the equivalent representation for the signal $y_n$ $$y_n = A_n\beta_n + \xi_n \quad (7a)$$
$$A_n = V_{n,M,E}\Phi \quad (7b)$$
$$V_{n,M,E} = X_n\sqrt{N}F_{N\times M} + \Xi_n \quad (7c)$$

where $[\Phi]_{k,l}=\phi(kT_s-\tau_n(l))$, $X_n=\text{diag}(x_{n,0}, \ldots, x_{n,N-1})$ and $\Xi_n\in\mathbb{C}^{N\times M}$, $\Xi_n=[0_{N\times\mu}|\Upsilon_n]$; the matrix $\Upsilon_n\in\mathbb{C}^{N\times E}$ has the rows $$[\Upsilon_n]_{k_i} = \frac{1}{N}(x_{n-1}^T\varpi - x_n^T)\Lambda^{(k)}$$

indexed by $k\in[0:N-1]$, where $\varpi=\text{diag}(\omega^{\mu 0}, \ldots, \omega^{\mu(N-1)})$. We define the matrix $\Lambda^{(k)}\in\mathbb{C}^{N\times E}$, with the entries $[\Lambda^{(k)}]_{a,b}=\sum_{u=0}^{E-1}X(u,b+\mu,k,a)$, $a\in[0:N-1]$, $b\in[0:E-1]$. We define the function $$x(u,r,k,a) = \begin{cases} 0, & \text{if } r\leq u+\mu. \\ \omega^{u(k-a)+r\alpha}, & \text{if } u+\mu+1\leq r\leq M-1. \end{cases} \quad (8)$$

The dictionary matrix $A_n$ of the system model described in equations (7a), (7b), (7c) contains herein the explicit ISI and ICI effects. We observe that, when no excess channel is present, the $\Xi_n$ becomes a null matrix, and the dictionary $A_n$ is reduced to the traditional representation $A_n=X_n\sqrt{N}F_{N\times M}\Phi$.

In the following a message passing receiver design for long CIR is described. Given the equivalent signal model (6), (7), the receiver task is to retrieve the sent bits $u_n$, i.e. it needs to estimate the OFDM symbols $x_n$; $x_{n-1}$ which are then demodulated, decoded and deinterleaved, to yield the raw bit stream $\hat{u}_n$. To that end, the receiver computes the channel matrices in (6) and equalizes the observation signal $y_n$ to obtain $\hat{x}_n$, $\hat{x}_{n-1}$. However, since the CIR remains unknown, the channel matrices in (6) are also unknown, therefore, in order to resolve $x_n$; $x_{n-1}$, the receiver computes the estimate $\hat{\beta}_n$ using (7) and the dictionary matrix $A_n$. Given the structure of the dictionary matrix in (7b), the receiver uses $\hat{x}_n$, $\hat{x}_{n-1}$ in the computation of $A_n$, and the problem becomes recursive, i.e. it needs to estimate jointly the channel and data symbols. The solution proposed for the aforementioned problem employs a message passing technique on the factor graph which models the dependencies in the signal model (6), (7). In the design of the receiver we make use of the sparse channel assumption and apply the MF-BP joint framework for performing CIR estimation and data detection. We introduce next the factor graph representation and the message-passing approach for updating the variables contained by the factor graph. We then introduce the combined MFBP message passing technique and the associated update rules. Finally, we detail the receiver architecture which employs the MF-BP framework.

In the following a factor graph representation and a message passing algorithm are described.

Let $x=\{x_i|x_i\in\mathcal{I}\}$ denote the set of the hidden r.v. included in the set $\mathcal{I}$ containing all the variables of the system; suppose their joint distribution factorizes as $p(x)\propto\prod_{f_a\in\mathcal{A}}f_a(x_a)$ where $x_a$ is the vector of arguments of function $f_a$, $f_a\in\mathcal{A}$. A factor graph provides an intuitive graphical representation of these dependencies, i.e. contains a variable node for each variable $x_i$, connected by an edge to the factor node $f_a$ only if $x_i$ is an argument of the function $f_a$. Neighbor nodes exchange information through the edges of the graph; we denote the message passed from the factor node $f_a$ to the variable node $x_i\in x_a$ as $m_{f_a\to x_i}$, and the message exchanged in the opposite direction as $n_{x_i\to f_a}$. Various algorithms have been proposed to update the messages exchanged between neighboring nodes, enabling thus a iterative statistical characterization of the unknown variables of the system.

The MF BP update rules are described in the following. In this disclosure a unified MF-BP approach according to E. Riegler, G. Kirkel, C. Manchon, M. Badiu, and B. Fleury, "Merging Belief Propagation and the Mean Field Approximation: A Free Energy Approach," IEEE Transactions on Information Theory, vol. 59, no. 1, pp. 588-602, 2013 is presented in order to compute the statistics of the unknown variables; this unified variational inference scheme is shown to bypass the complexity and potential intractability of computing the exact posterior pdfs of the hidden variables $p(x_i)$, by computing approximate pdfs of the latter ones, $(x_i)\approx q(x_i)$, also called beliefs. To this end, the factor graph is divided into two disjoint regions, corresponding to the two types of updates the messages undergo between the variable and factor nodes. We denote the set of all factor nodes with $\mathcal{A}$ and the two aforementioned regions with $\mathcal{A}_{BP}$ and $\mathcal{A}_{MF}$.

The rules for the updating the messages exchanged between the nodes of each region [28] and hence the beliefs of each hidden r.v. read:

$$m_{f_a \to x_i}^{MF}(x_i) = \exp\left(\sum_{x_a \setminus x_i} \log f_a(x_a) \prod_{j \in N(f_a) \setminus i} n_{x_j \to f_a}(x_j)\right), \quad (9a)$$

$$f_a \in A_{MF}, x_i \in N(f_a)$$

$$m_{f_a \to x_i}^{BP}(x_i) = d_a \sum_{x_a \setminus x_i} \log f_a(x_a) \prod_{j \in N(f_a) \setminus i} n_{x_j \to f_a}(x_j), \quad (9b)$$

$$f_a \in A_{BP}, x_i \in N(f_a)$$

$$n_{x_i \to f_a}(x_i) = e_i \prod_{f_c \in N(x_i) \cap A_{MF}} m_{f_c \to x_i}^{MF}(x_i) \prod_{f_c \in N(x_i) \cap A_{BP} \setminus f_a} m_{f_c \to x_i}^{BP}(x_i), \quad (9c)$$

$$x_i \in \mathcal{I}, f_a \in N(x_i)$$

$$q(x_i) = e_i \prod_{f_c \in N(x_i) \cap A_{MF}} m_{f_c \to x_i}^{MF}(x_i) \prod_{f_c \in N(x_i) \cap A_{BP}} m_{f_c \to x_i}^{BP}(x_i), x_i \in \mathcal{I} \quad (9d)$$

where $\mathcal{N}(x_i) \subset \mathcal{A}$ is the subset of functions $f_a$ that have variable $x_i$ as an argument, and $\mathcal{N}(f_a) \subset \mathcal{I}$ is the subset of variables that are arguments of $f_a$.

In the following a probabilistic model and factor graph representation is described.

We apply the MF-BP framework to the signal model (6), (7) to iteratively perform data detection, i.e. obtain $\hat{u}_n$, $\hat{u}_{n-1}$ from $\hat{x}_n$, $\hat{x}_{n-1}$, and channel estimation, i.e. compute $\hat{\beta}_n$. To that end, we express the posterior pdf $$p(x_n, x_{n-1}, \lambda, \beta_n | y_n) \propto p(y_n | x_n, x_{n-1}, \lambda, \beta_n) p(\lambda) p(\beta_n) I_X(x_n | c_n) I_{\{C(u_n)\}}(c_n) p(u_n) I_X(x_{n-1} | c_{n-1}) I_{\{C(u_{n-1})\}}(c_{n-1}) p(u_{n-1}) \quad (10)$$

where $I_X(x_i | c_i) = \prod_{k=0}^{N_D-1} I_{\{M(e_i^{(k)})\}}(x_i(d_{i,k}))$, and $p(u_i) = \prod_{v=0}^{K-1} p(u_i(v))$, $i \in \{n-1, n\}$. Since the channel vector $\beta_n$ and the delays $\tau_n$ remain unknown, applying MF-BP framework to (10) is computationally intractable; to leverage this problem, we propose a receiver architecture that works under the sparse channel assumption, i.e., since the channel is assumed to be composed of a few non-negligible multipath components that arrive with unknown delays, we postulate a delay vector of regularly spaced delays $\tau_n^{(s)} = [0\Delta\tau, \ldots, (P-1)\Delta\tau]^T$ with delay resolution $\Delta\tau$, and $P \gg L(n)$; we expect therefore that the associated complex channel vector $\alpha_n = [\alpha_n(0), \ldots, \alpha_n(P-1)]^T$ to be sparse, i.e. to have most of its entries zero. We can now define the approximate dictionary matrix (7b) $T_n \in \mathbb{C}^{N \times P}$ whose entries read $$[T_n]_{a,b} = \sum_{k=0}^{N-1} [V_{n,M^i,E^i}]_{a,k} [\Phi]_{k,b} \quad (11)$$

where $a \in [0:N-1]$, $b \in [0:P-1]$, $M' = [(\tau_n^{(s)}(P-1) + 2T)/T_s]$, $E' = M' - 1 - \mu$ and $[\Phi]_{k,b} = \phi(kT_s - \tau_n^{(s)}(b))$ Additionally, we consider the two transceiver filters are perfectly matched. We obtain thus an approximation of (7) and (6) which we will further employ in the design of the receiver.

$$y_n = T_n \alpha_n + \xi_n \quad (12a)$$

$$y_n = H'x_n + FC'F^H x_n + FC'F^H x_{n-1} + \xi_n \quad (12b)$$

where the noise $\xi_n$ is Gaussian distributed, i.e. $p(\xi_n) = CN(\xi_n; 0, \lambda^{-1} I_N)$ and the entries of H', C', S' $\in \mathbb{C}^{N \times N}$ are $H'_{m,i} = \sum_{v=0}^{M'-1} \sqrt{N} q'_n(vT_s) [F]_{m,n} I_{\{m\}}(i)$, $C'_{m,i} = -q'_n((N+m-i)T_s) I_{[0:E'-1]}(m) I_{[m+(N-E'-\mu):N-\mu-1]}(i)$, and $S'_{m,i} = q'_n((N+\mu+m-i)T_s) I_{[0:E'-1]}(m) I_{[m+(N-E'):N-1]}(i)$ respectively, with $q'_n(\tau) = \sum_{l=0}^{P-1} \alpha_n(l) \phi(\tau - \tau_n^{(s)}(l))$, $m, i \in [0:N-1]$. To enforce sparsity on $\alpha_n$ we use the sparse Bayesian learning framework that employs a sparsity-inducing probabilistic modeling of the prior pdf $p(\alpha_n)$; in this work, we choose the 2L hierarchical modeling and introduce a hyperprior $\gamma$ over the channel weights, i.e. $p(\alpha_n, \gamma) = p(\alpha_n | \gamma) p(\gamma)$. We follow the approach of [39]-[42] and select $p(\alpha_n | \gamma) = CN(\alpha_n; 0, \Gamma)$ with $\Gamma = \text{diag}(\gamma)$, the hyperprior pdf $p(\gamma) = \prod_{p=0}^{P-1} Ga(\gamma(p); \epsilon, \eta)$, and the noise precision pdf $p(\lambda) = Ga(\lambda; a, b)$.

TABLE I

Factor nodes definitions. The MF-BP approach is used and the factor graph is divided into two regions, i.e. MF and BP and the factor nodes corresponding to each region are defined.

| MF region | BP region |
|---|---|
| $f_{y_n}(x_n, x_{n-1}, \lambda, \alpha_n) = p(y_n | x_n, x_{n-1}, \lambda, \alpha_n)$ | $f_{x_i(d_{i,k})}(x_i(d_{i,k}), c_i^{(k)}) = I_{\{M(c_i^{(k)})\}}(x_i(d_{i,k}))$ |
| $f_\lambda(\lambda) = p(\lambda)$ | $f_{c_i}(c_i, u_i) = I_{\{c(u_i)\}}(c_i)$ |
| $f_{\alpha_n}(\alpha_n, \gamma) = p(\alpha_n | \gamma) p(\gamma)$ | $f_{u_i(v)}(u_i(v)) = p(u_i(v)) = \frac{1}{2}$ |
| $f_\gamma(\gamma) = p(\gamma)$ | |

Therefore, using the approximation (12a), the posterior pdf (10) becomes $$p(x_n, x_{n-1}, \lambda, \alpha_n | y_n) \propto p(y_n | x_n, x_{n-1}, \lambda, \alpha_n) p(\lambda) p(\alpha_n | \gamma) p(\gamma) I_X(x_n | c_n) I_{\{C(u_n)\}}(c_n) p(u_n) I_X(x_{n-1} | c_{n-1}) I_{\{C(u_{n-1})\}}(c_{n-1}) p(u_{n-1}) \quad (13)$$

where, $p(y_n | x_n, x_{n-1}, \lambda, \alpha_n) = CN(y_n; T_n \alpha_n, \lambda^{-1} I_N)$ from (12a). In order to introduce the factor graph representation of (13), we define the functions in Table I for $k \in [0:N-1]$, $i \in \{n-1, n\}$, $v \in [0:K-1]$ which enables the equivalent expression for the posterior pdf (13)

$$p(x_n, x_{n-1}, \lambda, \alpha_n | y_n) \propto f_{y_n}(x_n, x_{n-1}, \lambda, \alpha_n) f_\lambda(\lambda) f_{\alpha_n}(\alpha_n, \gamma) f_\gamma(\gamma) \quad (14)$$

$$\prod_{i=n-1}^{n} \left( f_{c_i}(c_i, u_i) \prod_{k=0}^{N_D-1} f_{x_i(d_{i,k})}(x_i(d_{i,k}), c_i^{(k)}) \prod_{v=0}^{K-1} f_{u_i(v)}(u_i(v)) \right)$$

Figure 6:
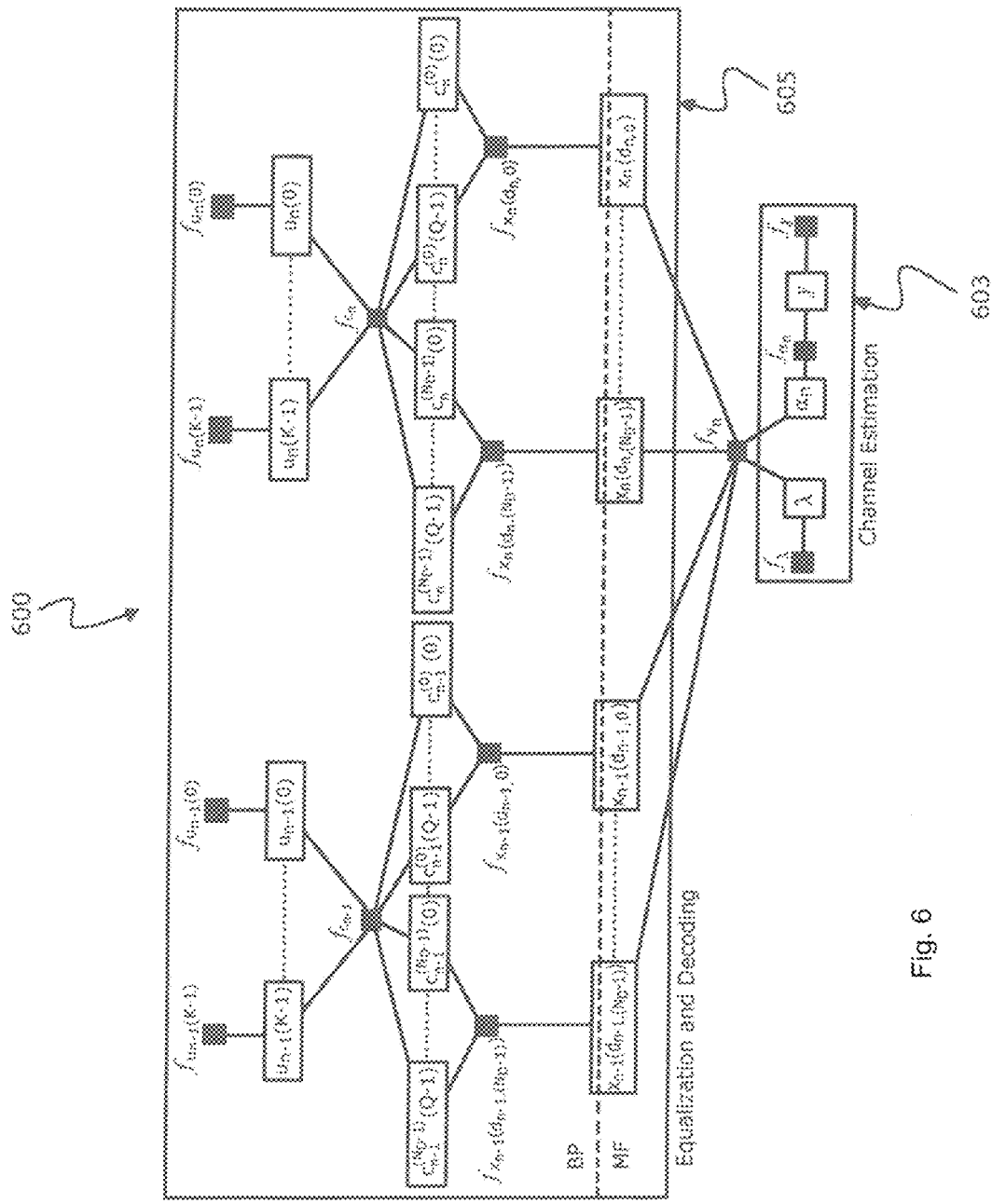
FIG. 6 is a diagram of a factor graph representation 600 of a receiver 500 such as shown in FIG. 5 in accordance with the disclosure.

Equation (14) is graphically represented by the factor graph depicted in FIG. 6. FIG. 6 illustrates a diagram of a factor graph representation 600 of the factorized system model with hierarchical channel prior. The node corresponding to each OFDM symbol is factorized into the nodes corresponding to the individual OFDM samples. The data beliefs factorize therefore into the product of individual samples beliefs. The factor graph representation 600 may be applied in a channel estimation block 503 in a transceiver system 590 such as shown in FIG. 5 or in a channel estimator 303, 403 as described above with respect to FIGS. 3 and 4 or in an estimating block 203 as described above with respect to FIG. 2.

In order to apply BP-MF algorithm to our problem, we divide the factor graph into the two regions and denote the two disjoint subsets of factor nodes in the MF and BP regions as $\mathcal{A}_{MF}$ and respectively $\mathcal{A}_{BP}$, where $\mathcal{A}_{MF} = \{f_{y_n}, f_\lambda, f_{\alpha_n}, f_\gamma\}$, $\mathcal{A}_{BP} = \mathcal{A} \setminus \mathcal{A}_{MF}$, and $\mathcal{A}_{MF} \cap \mathcal{A}_{BP} = \emptyset$, $\mathcal{A}$ denoting the set of all factor nodes in the graph.

In the following joint channel estimation and data detection is described.

While $y_n$ and the training symbols $\{x_n(p_{n,j}), x_{n-1}(p_{n-1,j}), j = [0:N_P-1]\}$ (which we call henceforth visible r.v.) are known, in order to recover the current sent information bit array $u_n$, the variables that need to be estimated in (14) are $\{x_n(d_{n,l}), x_{n-1}(d_{n-1,l}), l \in [0:N_D-1]\}$, $c_n$, $c_{n-1}$, $\lambda$, $\alpha_n$, $\gamma$ (the hidden r.v.). Specifically, the iterative algorithm enables the message exchange within and between the two subgraphs, i.e. Equalization and Decoding (ED) and Channel Estimation (CE). A complete iteration, that we index henceforth as IT, consists of obtaining estimates for all the hidden r.v.; for that, statistical information about the hidden r.v. is exchanged through the edges of the factor graph, until the algorithms outputs converged estimates of the hidden variables. One iteration consists thus in computing the full set of messages in the ED subgraph (the messages that propagated from the node $f_{y_n}$, to all factor nodes $f_{u_i(k)}$, $i \in [n-1:n]$, $k \in [0:K-1]$ and back to the former factor node), which corresponds to demapping, decoding, deinterleaving, interleaving, coding and soft mapping, followed by propagating messages in the CE subgraph (from $f_{y_n}$ to $f_\lambda$, $f_{\gamma}$, and backwards) which corresponds computing soft estimates for the noise precision and the channel vector.

In the following equalization and decoding sub-graph message passing and belief updates are described.

At each iteration IT, the soft estimates of the noise precision and the channel weights are passed upwards to the ED from the CE subgraph, i.e. $m_{y_n \to x_i(d_i,k)}$, and used to demap decode and deinterleave the data symbols (i.e. compute $$n_{x_i(d_i,k) \to f_{z_i(d_i,k)}},$$
$$m^{BP}_{f_{x_i(d_i,k)} \to c_i^k(m)},$$
$$n_{c_i^k(m) \to f_{c_i}},$$
$$m^{BP}_{f_{c_i} \to u_i(a)},$$
$$n_{u_i(a) \to f_{u_i(a)}} \, i \in [n-1:n],$$
$$k \in [0: N_D - 1],$$
$$m \in [0: Q - 1],$$
$$a \in [0: K - 1]):$$

once the soft bits have been computed, they are re-interleaved, coded and mapped to soft symbols (i.e. compute $$m^{BP}_{f_{u_i(a)} \to u_i(a)},$$
$$n_{u_i(a) \to f_{c_i}},$$
$$m^{BP}_{f_{c_i} \to c_i^k(m)},$$
$$n_{c_i^k(m) \to f_{x_i(d_i,k)}},$$
$$m^{BP}_{f_{x_i(d_i,k)} \to x_i(d_i,k)})$$

and passed to CE subgraph. These operations are equivalent to computing the belief of the data symbols i.e.

$$q(x_i(d_{i,k})) \propto m^{MF}_{f_{y_i} \to x_i(d_{i,k})}(x_i(d_{i,k})) m^{BP}_{f_{x_i(d_{i,k})} \to x_i(d_{i,k})}(x_i(d_{i,k})). \quad (15)$$

For computing the message $$m^{MF}_{f_{y_i} \to x_i(d_{i,k})}$$

we use (12b), where we define $M_{[n]} = H' + FC'F^H$ and $M_{[n-1]} = FS'F^H$. The message in the MF region then reads $$m^{MF}_{f_{y_i} \to x_i(d_{i,k})}(x_i(d_{i,k})) \propto \quad (16)$$

$$\propto \exp\left( -\langle \lambda \rangle_{q(\lambda)} \langle \|y_n - M_{[n]} x_n - M_{[n-1]} x_{n-1}\|_2^2 \rangle_{\prod_{p \neq k} q(x_i(d_{i,p})) \prod_{i=0}^{N_D-1} q(x_{j,j \in [n-1:n] \setminus [i]}(d_{j,i})) q(\alpha_n)} \right)$$

$$\propto CN\left(x_i(d_{i,k}); \mu^{MF}_{x_i(d_{i,k})}, \sigma^{MF}_{x_i(d_{i,k})}\right)$$

where $$\sigma^{MF}_{x_i(d_{i,k})} = \left\langle [M^H_{[i]} M_{[i]}]^{-1}_{d_{i,k}, d_{i,k}} \right\rangle_{q(\alpha_n)} \quad (17a)$$

$$\mu^{MF}_{x_i(d_{i,k})} = \quad (17b)$$

$$\sigma^{MF}_{x_i(d_{i,k})} \left( -\left\langle [M^H_{[i]} M_{[i]}]^{-1}_{d_{i,k}, \setminus \{d_{i,k}\}} \right\rangle_{q(\alpha_n)} \langle x_i(\cdot \setminus \{d_{i,k}\}) \rangle_{\prod_{p \neq k} q(x_i(d_{i,p}))} + \right.$$

$$\left\langle [M^H_{[i]}]_{d_{i,k}, \cdot} \right\rangle_{q(\alpha_n)} y_n - \left\langle [M^H_{[i]} M_{[j] \in [n-1: n] \setminus [i]}]_{d_{i,k}, \cdot} \right\rangle_{q(\alpha_n)}$$

$$\left. \left\langle x_{j,j \in [n-1:n] \setminus [i]} \right\rangle_{\prod_{i=0}^{N_D-1} q(x_{j,j \in [n-1: n] \setminus [i]}(d_{j,i}))} \right).$$

The message in the BP region reads $$m^{BP}_{f_{x_i(d_{i,k})} \to x_i(d_{i,k})}(x_i(d_{i,k})) \propto \quad (18)$$

$$\sum_{c_i^{(k)} \in \{0,1\}^Q} f_{x_i(d_{i,k})}(x_i(d_{i,k}), c_i^{(k)}) \prod_{v=0}^{Q-1} n_{c_i^{(k)}(v) \to f_{x_i(d_{i,k})}}(c_i^{(k)}(v)).$$

The region of the ED sub-graph responsible for the decoding, deinterleaving, re-interleaving and coding works as a soft-input soft-output decoder.

In the following channel estimation sub-graph message passing and belief updates are described.

Once soft estimates for $x_n$, $x_{n-1}$ have been obtained, the messages containing them are passed along the edges connecting the ED and CE subgraph, i.e. $n_{x_i(d_{i,k}) \to f_y}$, and used in the computations of the noise precision and channel weights. The belief of the noise precision reads $$q(\lambda) \propto m^{MF}_{f_{y_n} \to \lambda}(\lambda) m^{MF}_{f_\lambda \to \lambda}(\lambda) \quad (19)$$

where the messages are $$m^{MF}_{f_{y_n} \to \lambda} \propto \lambda^N \exp\left(-\lambda \langle \|y_n - T_n \alpha_n\|_2^2 \rangle_{q(x_n), q(x_{n-1}), q(\alpha_n)}\right) \quad (20a)$$

$$m^{MF}_{f_\lambda \to \lambda}(\lambda) \propto \lambda^{a-1} \exp(-b\lambda). \quad (20b)$$

Subsequently, $q(\lambda) \propto \lambda^{a+N-1} \exp(-\lambda(b + \langle \|y_n - T_n \alpha_n\|_2^2 \rangle_{q(x_n), q(x_{n-1}), q(\alpha_n)})) \propto Ga(\lambda; a+N, b + \langle \|y_n - T_n \alpha_n\|_2^2 \rangle_{q(x_n), q(x_{n-1}), q(\alpha_n)})$; we obtain thus a closed form for the first moment, i.e.

$$\langle \lambda \rangle_{q(\lambda)} = \frac{\alpha + N}{b + \langle \|y_n - T_n \alpha_n\|_2^2 \rangle_{q(x_n),q(x_{n-1}),q(\alpha_n)}}.$$

For the estimation of the channel weights, we propose two approaches: one in which we jointly estimate all the weights, i.e. compute the belief $q(\alpha_n)$ and one in which we compute the beliefs of the individual weights $q(\alpha_n(p))$, $p \in [0:P-1]$, by assuming a fully factorized $q(\alpha_n)$.

In the following joint channel weights update is described.

For the first approach, we assume the factor graph representation according to FIG. 6 where the channel weights and the hyperprior vectors are modeled each by one variable node. As a result, the belief of the hyperprior is the product of two messages, i.e.

$$q(\gamma) \propto m_{f_\gamma \to \gamma}^{MF}(\gamma) m_{f_{\alpha n} \to \gamma}^{MF}(\gamma) \quad (21)$$

where the messages from the factor nodes $f_\gamma$ and $f_{\alpha_n}$ to the variable node $\gamma$ $$m_{f_\gamma \to \gamma}^{MF} \propto \prod_{p=0}^{P-1} \gamma(p)^{\epsilon-1} \exp(-\eta \gamma(p)) \quad (22a)$$

$$m_{f_{\alpha n} \to \gamma}^{MF}(\gamma) \propto \prod_{p=0}^{P-1} \gamma(p)^{-1} \exp(-\gamma(p)^{-1} \langle |\alpha(p)|^2 \rangle_{q(\alpha_n)}) \quad (22b)$$

yield $q(\gamma)$ to be the product of generalized inverse Gaussian pdfs and the $n^{th}$, $n \in \mathbb{R}$ order moments of $\gamma(p)$, $p \in [0:P-1]$, to be $$\langle \gamma(p)^n \rangle_{q(\gamma)} = \left( \frac{\langle |\alpha(p)|^2 \rangle_{q(\alpha_n)}}{\eta} \right)^{\frac{n}{2}} \frac{K_{\epsilon-1+n}(2\sqrt{\eta \langle |\alpha(p)|^2 \rangle_{q(\alpha_n)}})}{K_{\epsilon-1}(2\sqrt{\eta \langle |\alpha(p)|^2 \rangle_{q(\alpha_n)}})} \quad (23)$$

Finally, the belief of the channel weights $q(\alpha_n)$ is $$q(\alpha_n) \propto m_{f_{yn} \to \alpha_n}^{MF}(\alpha_n) m_{f_{\alpha n} \to \alpha_n}^{MF}(\alpha_n) \quad (24)$$

where the associated messages $$m_{f_{yn} \to \alpha_n}^{MF}(\alpha_n) \propto \exp(-\langle \lambda \rangle_{q(\lambda)} \quad (25a)$$
$$(\alpha_n^H \langle T_n^H T_n \rangle_{q(x_n),q(x_{n-1})} \alpha_n + 2Re(y_n \langle T_n \rangle_{q(x_n),q(x_{n-1})} \alpha_n)))$$

$$m_{f_{\alpha n} \to \alpha_n}^{MF}(\alpha_n) \propto \exp(-\alpha_n^H \langle \Gamma^{-1} \rangle_{q(\gamma)} \alpha_n) \quad (25b)$$

yield $q(\alpha_n) \propto CN(\alpha_n; \mu_{\alpha_n}; \Sigma_{\alpha_n})$ where, $\Sigma_{\alpha_n} = (\langle \lambda \rangle_{q(\lambda)} \langle T_n^H T_n \rangle_{q(x_n),q(x_{n-1})} + \langle \Gamma^{-1} \rangle_{q(\gamma)})^{-1}$ and $\mu_{\alpha_n} = \langle \lambda \rangle_{q(\lambda)} \Sigma_{\alpha_n} \langle T_n \rangle_{q(x_n),q(x_{n-1})}^H y_n$.

In the following, disjoint channel weights update is described.

We next utilize the naïve MF approximation and force the belief of the channel weights to fully factorize as follows $$q(\alpha_n) = \prod_{p=0}^{P-1} q(\alpha_n(i)). \quad (26)$$

Figure 7:
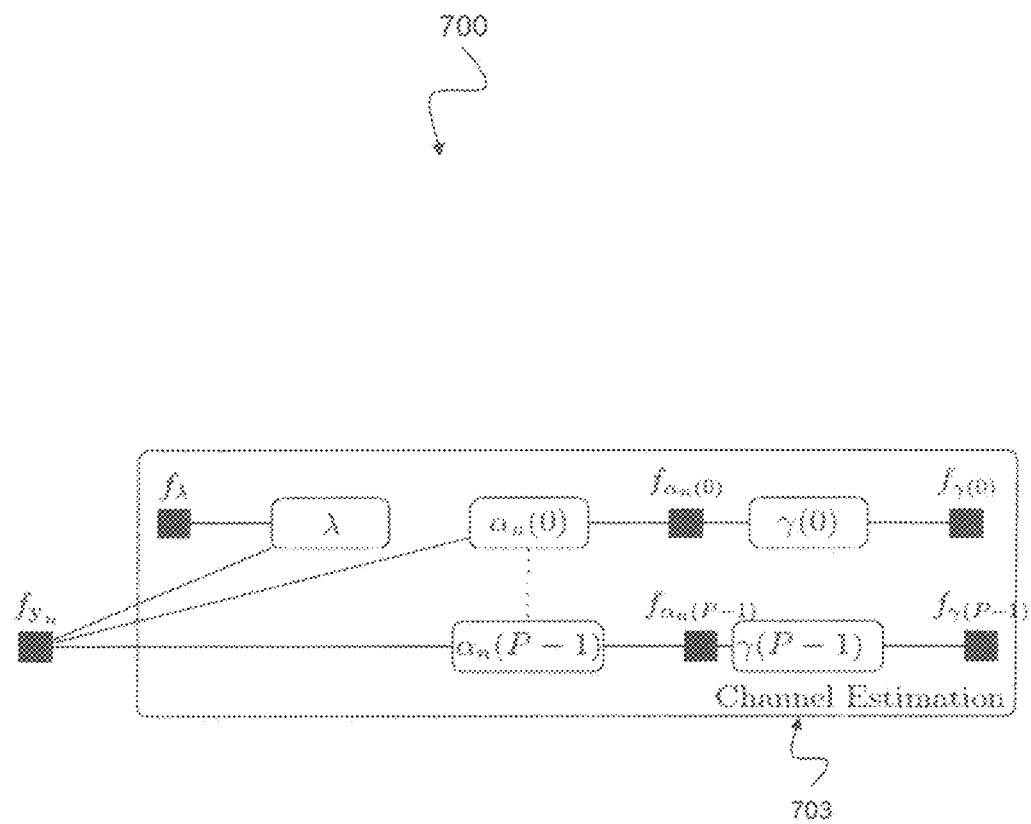
FIG. 7 is a diagram of a factor graph representation 700 of a channel estimation block 503 in receiver 500 such as shown in FIG. 5 in accordance with the disclosure.

We define the local functions $f_{\alpha_n(i)}(\alpha(i), \gamma(i)) = p(\alpha_n(i), \gamma(i))$, $f_{\gamma(i)}(\gamma(i)) = p(\gamma(i))$ where $p(\alpha_n(i)|\gamma(i)) = CN(\alpha_n(i); 0, \gamma(i))$, $p(\gamma(i)) = Ga(\gamma(i); \epsilon, \eta)$, and depict the dependencies in the factor graph from FIG. 7. FIG. 7 illustrates a diagram of a factor graph representation 700 of the factorized system model with hierarchical channel prior. The channel vector is fully factorized. The factor graph representation 700 may be applied in a channel estimation block 503 in a transceiver system 590 such as shown in FIG. 5 or in a channel estimator 303, 403 as described above with respect to FIGS. 3 and 4 or in an estimating block 203 as described above with respect to FIG. 2.

The belief of the scalar hyperprior $\gamma(i)$, $i \in [0:P-1]$, $$q(\gamma(i)) \propto m_{f_{\alpha n}(i) \to \gamma(i)}^{MF} m_{f_{\gamma(i)} \to \gamma(i)}^{MF} \quad (27)$$

is, similar to (21), a generalized inverse Gaussian pdf, and $\gamma(i)$ has the moments as defined in (23). Once the hyperprior is updated, the belief of each channel weight $\alpha_n(i)$, $i \in [0:P-1]$ is updated, i.e. $q(\alpha_n(i)) \propto m_{f_{yn} \to \alpha_n(i)} m_{f_{\alpha n}(i) \to \alpha_n(i)} \propto CN(\alpha_n(i); \mu(i), \Sigma(i))$ with $$\Sigma(i) = (\langle \lambda \rangle_{q(\lambda)} \zeta(i) + \langle \gamma(i)^{-1} \rangle_{q(\gamma(i))})^{-1} \quad (28a)$$

$$\mu(i) = \langle \lambda \rangle_{q(\lambda)} \Sigma(i) \theta(i) \quad (28b)$$

where $\theta(i) = \langle [T_n]_{-,i}^H \rangle_{q(x_n),q(x_{n-1})} y_n - \sum_{p=0, p \neq i}^{P-1} \langle [T_n]_{-,i}^H [T_n]_{-,p} \rangle_{q(x_n),q(x_{n-1})} \langle \alpha_n(p) \rangle_{(q(\alpha_n(p)))}$ and $\zeta(i) = \langle [T_n]_{-,i}^H [T_n]_{-,i} \rangle_{q(x_n),q(x_{n-1})}$ are the $i^{th}$ entries in the vectors $\theta$ and $\zeta$, respectively. The disjoint channel estimation scheme updates consecutively each channel weight $\alpha_n(i)$ while keeping the other $\alpha_n(j)$, $j \in [0:P-1] \setminus \{i\}$ fixed.

In the following a fast scheme is described. Since the algorithm is computational expensive per iteration, we present a recursive scheme that improves the convergence rate; the scheme explores the simplification (26) and consists of sequentially updating each $\alpha_n(i)$ by performing ad-infinitum subiterations along the edges of each subgraph defined by the tuple $(\alpha_n(i), f_{\alpha_n(i)}, \gamma(i), f_{\gamma(i)})$.

One subiteration t consists of computing the messages $n_{\alpha_n(i) \to f_{\alpha n}(i)}$, $m_{f_{\alpha n}(i) \to \gamma(i)}^{MF}$, $n_{\gamma(i) \to f_{\gamma(i)}}$, $m_{f_{\gamma(i)} \to \gamma(i)}^{MF}$, $n_{\gamma(i) \to f_{\alpha n}(i)}^{MF}$, $m_{f_{\alpha n}(i) \to \alpha_n(i)}^{MF}$ and yields the updates (27), (28b), i.e. $\langle \gamma(i) \rangle_{q(\gamma(i))}^{[t]}$ and $\langle \alpha_n(i) \rangle_{q(\alpha_n(i))}^{[t]}$. These updates are performed by fixing all the other hidden r.v., i.e. $\lambda$, $\alpha_n(j)$, $\gamma(j)$, $j \in [0:P-1] \setminus \{i\}$], to their most recent estimated values. Combining (23), (28b) and (28a), we obtain recursive updates for the two hidden r.v., i.e. $\langle \gamma(i) \rangle_{q(\gamma(i))}^{[t]} = f_1(\langle \gamma(i) \rangle_{q(\gamma(i))}^{[t-1]})$ and $\langle \alpha_n(i) \rangle_{q(\alpha_n(i))}^{[t]} = f_2(\langle \alpha_n(i) \rangle_{q(\alpha_n(i))}^{[t-1]})$. The ad-infinitum scheme consists of $t \to \infty$ subiterations, until either of the estimates $\langle \gamma(i) \rangle_{q(\gamma(i))}^{[t]}$, $\langle \alpha_n(i) \rangle_{q(\alpha_n(i))}^{[t]}$ has converged to its stable value $\langle \gamma(i) \rangle_{q(\gamma(i))}$, $\langle \alpha_n(i) \rangle_{q(\alpha_n(i))}$, i.e.

$$\lim_{t \to \infty} \langle \gamma(i) \rangle_{q(\gamma(i))}^{[t]} = \langle \gamma(i) \rangle_{q(\gamma(i))}$$

or $$\lim_{t \to \infty} \langle \alpha_n(i) \rangle_{q(\alpha_n(i))}^{[t]} = \langle \alpha_n(i) \rangle_{q(\alpha_n(i))}$$

that is equivalent to computing the fixed points $\langle \gamma(i) \rangle_{q(\gamma(i))}$, $\langle \alpha_n(i) \rangle_{q(\alpha_n(i))}$, for either of the functions $f_1(\gamma(i))$, $f_2(\alpha_n(i))$. In this work, we choose to compute the fixed points $\langle \gamma(i) \rangle_{q(\gamma(i))}$ of $f_2(\gamma(i))$ that we plug in (28b), (28a) to update $\langle \alpha_n(i) \rangle_{q(\alpha(i))}$, $\langle |\alpha_n(i)|^2 \rangle_{q(\alpha(i))}$. Since working with the moments (23) yields computational expensive fixed points, we choose to work with the mode of (27), i.e.

$$\langle \gamma(i) \rangle_{q(\gamma(i))}^{[t]} = \frac{\epsilon - 2 + \sqrt{(\epsilon-2)^2 + 4\eta \langle |\alpha_n(i)|^2 \rangle_{q(\alpha_n(i))}^{[t-1]}}}{2\eta}. \quad (30)$$

Inserting (28b) and (28a) in (30), we obtain a recursive update $\langle \gamma(i) \rangle_{q(\gamma(i))}^{[t]} = g(\langle \gamma(i) \rangle_{q(\gamma(i))}^{[t-1]})$ where $g(\gamma(i))$ is $$g(\gamma(i)) = \frac{\epsilon - 2}{2\eta} + \sqrt{\left(\frac{\epsilon - 2}{2\eta}\right)^2 + \frac{\gamma(i)(\mu\gamma(i) + c^2)}{\eta(\gamma(i) + c)^2}} \quad (31)$$

where $c^{-1} = \lambda \zeta(i)$, $u = c + q$, and whose fixed points fulfill (29). We need thus the solutions of $\gamma(i) = g(\gamma(i))$ or equivalently the ones of $\gamma(i) f(\gamma(i)) = 0$, where $f(\gamma(i))$ is $$f(\gamma(i)) = \eta \gamma^3(i) + [2\eta c - (\epsilon-2)]\gamma^2(i) + [\eta c^2 - c(2\epsilon-3) - q]\gamma(i) - (\epsilon-1)c^2 \quad (32)$$

with $q = \zeta(i)^{-2}[\theta(i)]^2$ and $\hat{\gamma}(i) = 0$ is always a solution.

In the following scheduling the disjoint weight updates is described. Since the presented disjoint update scheme works sequentially, the P channel weights updates can be performed in different order e.g (i) consecutive updates, (ii) updates based on an initial least-square channel estimation, (iii) by maximizing the variational free energy difference between two consecutive iterations IT−1, IT, when estimating each $\alpha_n(i)$, i.e. $\Delta F^{[IT]}(i) = F^{[IT]}(i) - F^{[IT-1]}(i)$, $i \in [0:P-1]$.

The variational free energy of the system is $$F = \sum_{\alpha_n, \gamma, x_{n-1}, x_n, \lambda} q(\alpha_n, \gamma, x_{n-1}, x_n, \lambda) \log \frac{q(\alpha_n, \gamma, x_{n-1}, x_n, \lambda)}{p(\alpha_n, \gamma, x_{n-1}, x_n, \lambda, y_n)p(y_n)} \quad (33)$$

Accounting for the factorization (26) and the aforementioned assumptions, the variational free energy when updating $\alpha_n(i)$ at iteration IT is $F^{[IT]}(i) = -\log(\Sigma^{[IT]}(i)) - 2\lambda \text{Re}\{\mu^{[IT]}(i)\theta(i)^*\} + \lambda \zeta(i)(\Sigma^{[IT]}(i) + |\mu^{[IT]}(i)|^2)$ and $\Delta F^{[IT]}(i)$ reads $$\Delta F^{[IT]}(i) = -\log\left(\frac{\Sigma^{[IT]}(i)}{\Sigma^{[IT-1]}(i)}\right) - 2\lambda \text{Re}\{\mu^{[IT]}(i)\theta(i)^* - \mu^{[IT-1]}(i)\theta(i)^*\} + \lambda\left(\varsigma(i)\left(\Sigma^{[IT]}(i) + |\mu^{[IT]}(i)|^2\right) - \varsigma(i)\left(\Sigma^{[IT-1]}(i) + |\mu^{[IT-1]}(i)|^2\right)\right) \quad (34)$$

Once the statistics of the channel $\alpha_n$ are jointly or disjointly obtained using (24), (25) or (28b), (28a), and having previously obtained the statistics of $x_n$, $x_n$, $\lambda$, $\gamma$ with (15), (19), (21), the current iteration IT is complete and the next iteration of updates IT+1 is initiated if the convergence criteria are not fulfilled.

In the following, scheduling is described. Since the factor graph 600 illustrated in FIG. 6 contains loops, after initialization, there are several ways of scheduling the updates of the hidden r.v. and the Algorithm 1 needs several iterations in order to produce converged results.

---

Algorithm 1 Iterative data detection and channel estimation
for insufficient CP systems 1: Initialize $(\lambda)_{q(\lambda)}$, $(\gamma^{-1})_{q(\gamma)}$
2: $(\alpha_n)_{q(\alpha_n)} \leftarrow 0$, $(\alpha_n \alpha_n^H)_{q(\alpha_n)} \leftarrow 0$

---

Algorithm 1 Iterative data detection and channel estimation
for insufficient CP systems 3: for $i \in [n-1:n]$ do
4:    for $k \in [0:N_D - 1]$ do
5:      $(x_i(d_{i,k}))_{q(x_i(d_{i,k}))} \leftarrow 0$,
6:      $(|x_i(d_{i,k})|^2)_{q(x_i(d_{i,k}))} \leftarrow 0$
7:    end for
8: end for
9: IT ← 0
10: while (convergence metric ≠ convergence threshold) or ( IT ≤ max full-iterations) do
11:    for $i \in [n-1:n]$ do
12:      for $k \in [0:N_D - 1]$ do
13:         compute $q(x_i(d_{i,k}))$, $(x_i(d_{i,k}))_{q(x_i(d_{i,k}))}$, $(|x_i(d_{i,k})|^2)_{q(x_i(d_{i,k}))}$ using (15), (17),(18)
14:      end for
15:    end for
16:    Compute $q(\lambda)$, $(\lambda)_{q(\lambda)}$ using (19)
17:    if (joint $\alpha_n$ update scheme then
18:      it ← 0
19:      while it ≤ max sub-iterations do
20:         compute $q(\gamma)$, $(\gamma)_{q(\gamma)}$, using (21)
21:         compute $q(\alpha_n)$, $(\alpha_n)_{q(\alpha_n)}$, $(\alpha_n \alpha_n^H)_{q(\alpha_n)}$ using (24), (25)
22:         it ← it + 1
23:      end while
24:    else if (disjoint $\alpha_n$ update scheme then
25:      Select Order
26:      for p ∈ Order do
27:         compute $(\gamma(p))_{q(\gamma(p))}$ by finding the roots of (32)
28:         compute $(\alpha_n(p))_{q(\alpha_n(p))}$, $(|\alpha_n(p)|^2)_{q(\alpha_n(p))}$ using (28b), (28a)
29:         compute $\Delta F^{[IT]}(p)$ using (34)
30:      end for
31:    end if
32:    update convergence metric
33:    IT ← IT + 1
34: end while

---

In the following a stochastic channel model for long delays is presented. The stochastic channel model for long delays is similar to the COST Bad Urban model according to P. Kysti, J. Meinil, L. Hentil, X. Zhao, T. Jms, C. Schneider, M. Narandzic, M. Milojevic, A. Hong, J. Ylitalo, V.-M. Holappa, M. Alatossava, R. Bultitude, Y. deJong, and T. Rautiainen: "IST-4-027756 WINNER II, D1.1.1 v1.1, WINNER II interim channel models" in Information Society Technologies, Tech. Rep., 2006. The CIR is considered invariant during an OFDM symbol and consists of two clusters, the first cluster (which we will refer to henceforth as cluster 1) containing the multipath components with delays shorter than CP and the second (cluster 2) the components with delays beyond CP. The CIR during the $n^{th}$ OFDM symbol reads:

$$g_n(\tau) = \sum_{l=0}^{L_{n,(1)}-1} \beta_{n,(1)}(l)\delta(\tau - \tau_{n,(1)}(l)) + \sum_{l=0}^{L_{n,(2)}-1} \beta_{n,(2)}(l)\delta(\tau - \tau_{n,(2)}(l)) \quad (35)$$

where $L_{n,(1)}$ and $L_{n,(2)}$ represent the number of components of cluster 1 and cluster 2. The delay vectors are $\tau_{n,(1)} = [\tau_{n,(1)}(0), \ldots, \tau_{n,(1)}(L_1-1)]$ and $\tau_{n,(2)} = [\tau_{n,(2)}(0), \ldots, \tau_{n,(2)}(L_2-1)]$. The power-delay-profile reads $$P(\tau) = \begin{cases} Q\exp(-\tau) & 0 \leq \tau_{[\mu s]} \leq \tau_{1M} \\ aQ\exp(\tau_{1M} - \tau) & \tau_{1M} \leq \tau_{[\mu s]} \leq \tau_{2M} \end{cases}. \quad (36)$$

where $\tau_{1M}=T_{CP}$. The joint pdf the unknown parameters is $$p(\beta_{n,(1)}, \beta_{n,(1)}, \tau_{n,(1)}, \tau_{n,(2)}, L_{n(1)}, L_{n(2)}) = \quad (37)$$

$$\prod_{k=1}^{2} p(\beta_{n,(k)} \mid \tau_{n,(k)}) p(\tau_{n,(k)} \mid L_{n,(k)}) p(L_{n,(k)})$$

where $\beta_{n,(k)}=[\beta_{n,(k)}(0), \ldots, \beta_{n,(k)}-1)]^T$, and $$p(\beta_{n,(k)} \mid \tau_{n,(k)}) = \prod_{i=0}^{L_{n,(k)}-1} CN(\beta_{n,(k)}(l); 0, P(\tau_{n,(k)}(l))) \quad (38a)$$

$$p(\tau_{n,(k)} \mid L_{n,(k)}) = \prod_{i=0}^{L_{n,(k)}-1} p(\tau_{n,(k)}(l)) \quad (38b)$$

$$p(L_{n,(k)}) = Poisson(\mu_{L_k}) \quad (38c)$$

$\forall k \in [1:2]$, with $p(\tau_{n,(1)}(l))=u(0,\tau_{1M})$, $l \in [0:L_{n,(1)}-1]$ and $p(\tau_{n,(2)}(l))=u(\tau_{1M},\tau_{2M})$, $l \in [0:L_{n,(2)}-1]$. The CIR always exhibits a component at $\tau_{n,(1)}=0$ and therefore, the instantaneous total multipath power gain is $G=|\beta_{n,(1)}(0)|^2 + \sum_{i=1}^{L_{n,(1)}-1} |\beta_{n,(1)}(l)|^2 + \sum_{l=0}^{L_{n,(2)}-1} |\beta_{n,(2)}(l)|^2$ with $$\mathbb{E}[G] = |\beta_{n,(1)}(0)|^2 + \left(\sum_{l=1}^{L_{n,(1)}-1} |\beta_{n,(1)}(l)|^2\right)_{p(\beta_{n,(1)},\tau_{(1)},L_{n,(1)})} + \quad (39)$$
$$\left(\sum_{l=1}^{L_{n,(2)}-1} |\beta_{n,(2)}(l)|^2\right)_{p(\beta_{n,(2)},\tau_{(2)},L_{n,(2)})}$$
$$= Q + Q\frac{\mu L_1 - 1}{\tau_{1M}}(1 - \exp(-\tau_{1M})) + aQ\frac{\mu L_2}{\tau_{2M} - \tau_{1M}}(1 - \exp(-(\tau_{2M} - \tau_{1M})))$$

Figure 8:
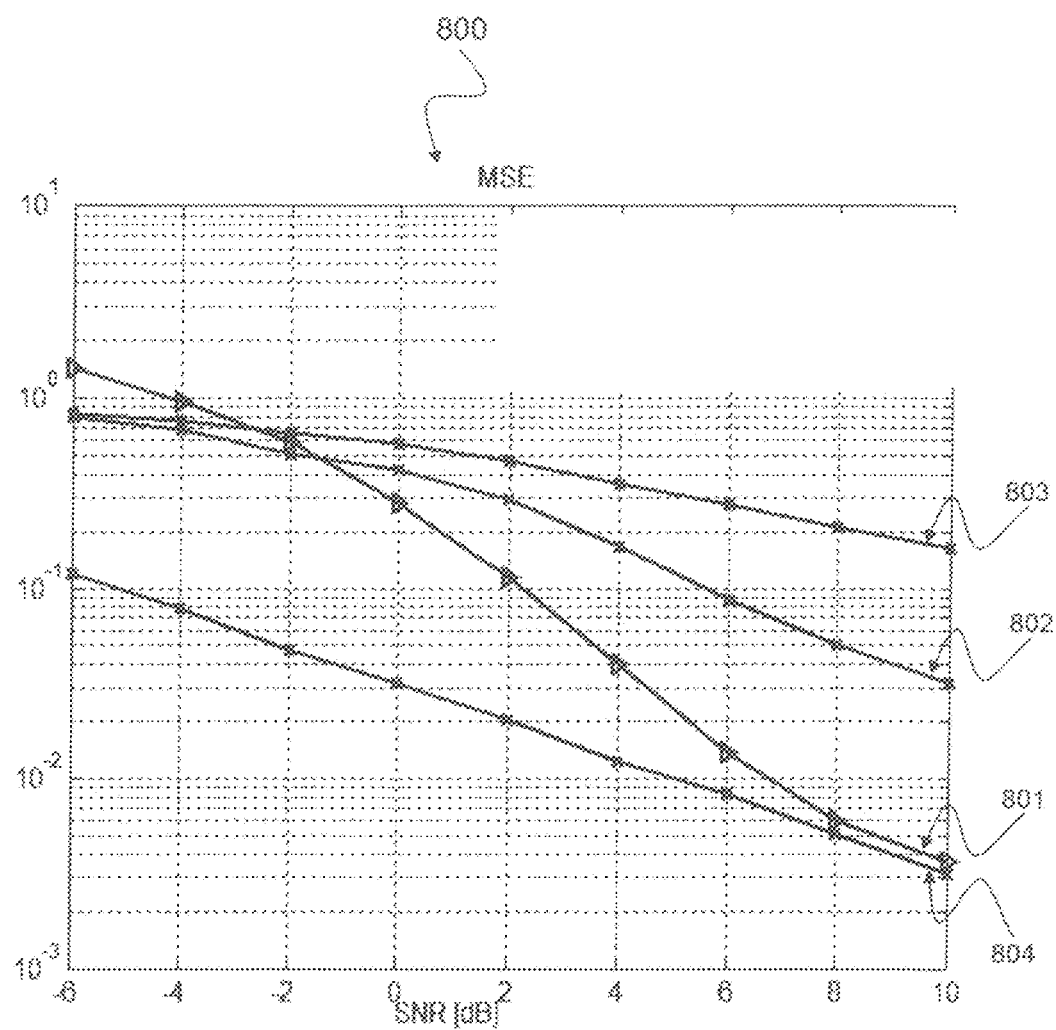
FIG. 8 is a performance diagram illustrating Mean Square Error (MSE) over Signal to Noise Ratio (SNR) of a Mean Field (MF) channel estimation technique in accordance with the disclosure in comparison with other channel estimation techniques.
Figure 9:
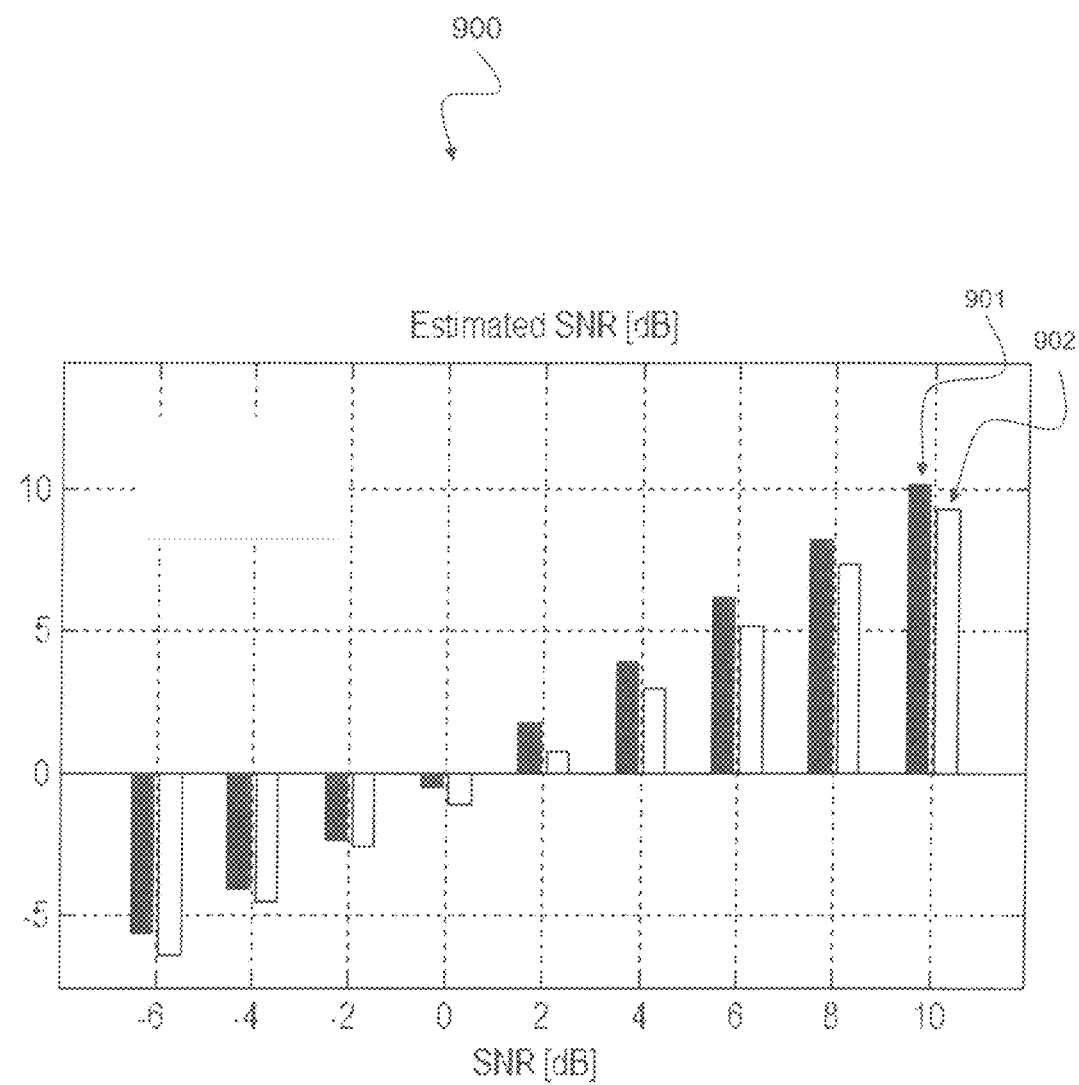
FIG. 9 is a performance diagram illustrating estimated SNR over SNR of an MF channel estimation technique in accordance with the disclosure in comparison with an ICI unaware channel estimation technique.

FIG. 8 and FIG. 9 are performance diagrams illustrating Mean Square Error (MSE) 800 and estimated Signal to Noise Ratio (SNR) 900 over SNR of a Mean Field (MF) channel estimation technique 801 in accordance with the disclosure in comparison with other channel estimation techniques.

The receiver 500 described in FIG. 5 referred to by using the abbreviation MF is compared with a Robust Wiener Filter (RWF) 803 and a reference receiver which uses a pilot-based time-domain channel estimator abbreviated as SBL 802. RWF is described by Li, Y., Cimini, L. J., & Sollenberger, N. R. (1998), "Robust Channel Estimation for OFDM Systems with Rapid Dispersive Fading" in IEEE Transactions on Communications, Vol. 46, No. 7, 902-915. SBL is described by Pedersen, N., Navarro, C., Badiu, M., Shutin, D., & Fleury, B. (2013) in "Sparse Estimation Using Bayesian Hierarchical Modeling for Real and Complex Models", retrieved from arXiv:1108.4324v2: http://arxiv.org/abs/1108.4324. As a lower bound for the comparison, a genie-aided MMSE estimator 804 is used as explained next. Table 1 illustrates the system and channel parameters used for the performance tests.

TABLE 1 system and channel parameters used in the performance tests
System and channel parameters

| | |
|---|---|
| Ts [sampling time, ns] | 50 |
| N [no. subcarriers] | 128 |

TABLE 1-continued system and channel parameters used in the performance tests
System and channel parameters

| | | |
|---|---|---|
| CP [Ts] | | 10 |
| Modulation | | QPSK |
| Convolutional channel code | | Rate = 1/3, (133, 171, 165)$_8$ |
| SNR range [dB] | | [−6, 10] |
| Channel | P [dB] | [−6 −6 −6 −6] |
| Observation: the CIR consists of | Delay [Ts] | [0 7 14 17] |
| 4 multipath components of equal power, 2 of which are span outside the CP, causing ISI and ICI. | | |

In FIG. 8, the MSE 800 of MF 801 is observed with respect to SBL 802 and RWF 803 and the genie-aided MMSE estimator 804. In FIG. 9, the estimated SNR 900 of MF 901 is observed with respect to SBL 902. The genie-aided MMSE channel estimator knows the noise variance, the exact delays of the CIR and the dictionary $A_{n,n-1}$, and it estimates only the complex gains $\beta$. At high SNR, RWF 803 and SBL 802 (unaware of the ICI and ISI) exhibit performance degradation due to the treatment of interference as noise. This behavior is also revealed by the results in FIG. 9 which illustrate how the ICI-unaware estimator (SBL) 902 underestimates the SNR. By contrast, MF 901 differentiates between ICI, ISI and AWGN and, therefore, does not lose the CIR or SNR estimation accuracy, approaching the MMSE genie-aided estimator at high SNR.

Figure 10:
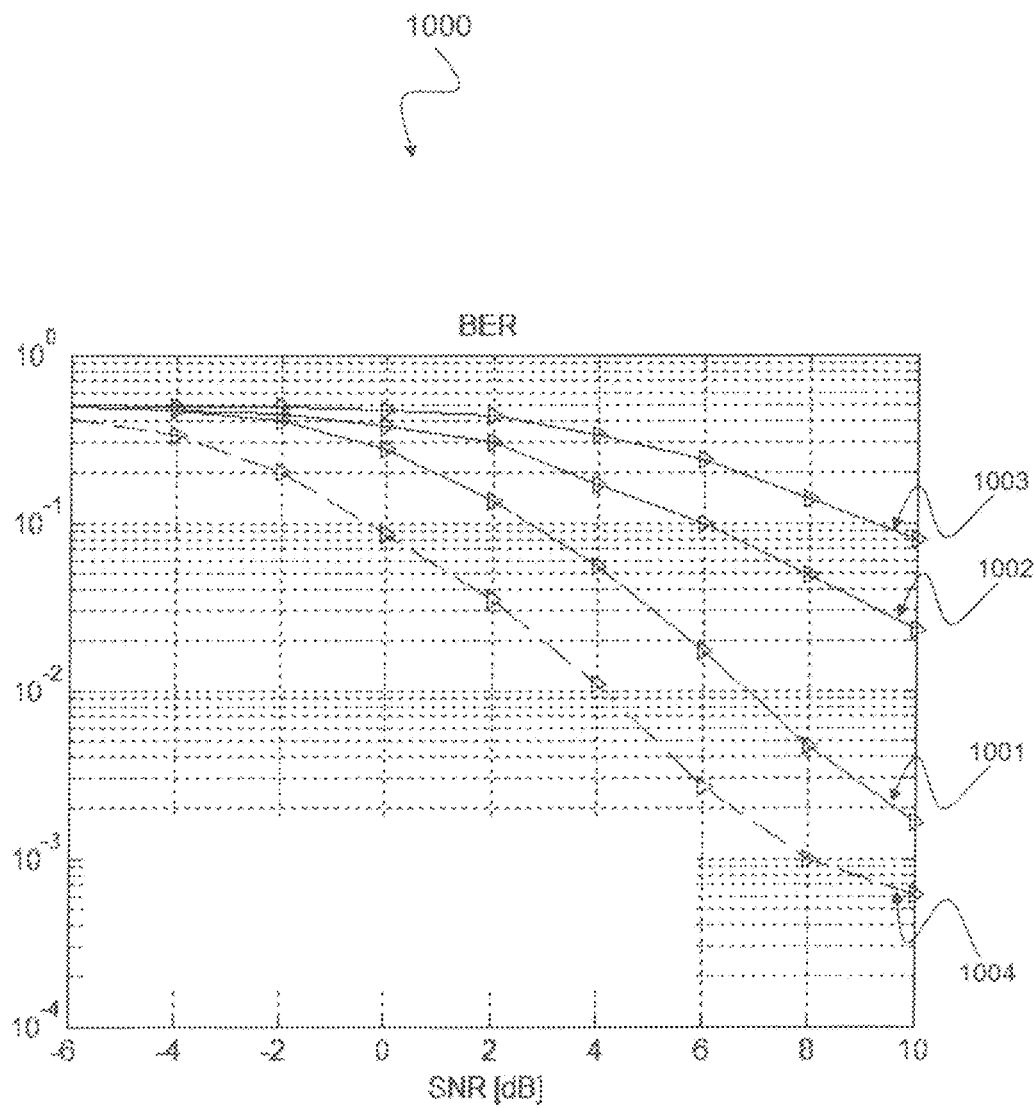
FIG. 10 is a performance diagram illustrating Bit Error Rate (BER) over SNR of an MF channel estimation technique in accordance with the disclosure in comparison with other channel estimation techniques.

FIG. 10 is a performance diagram illustrating Bit Error Rate (BER) 1000 over SNR of an MF channel estimation technique 1001 in accordance with the disclosure in comparison with other channel estimation techniques. In FIG. 10 the gain is shown in terms of BER of the MF receiver 1001 compared with SBL 1002, RWF 1003 and an genie-aided receiver 1004 which knows perfectly the CIR, ISI, ICI and noise variance. The receiver according to aspects of this disclosure, named as MF 1001, e.g. as described above with respect to one of FIGS. 3 to 5 clearly outperforms the other receivers 1002, 1003, and approaches the performance of the genie-aided receiver 1004 at high SNR.

Figure 11A:
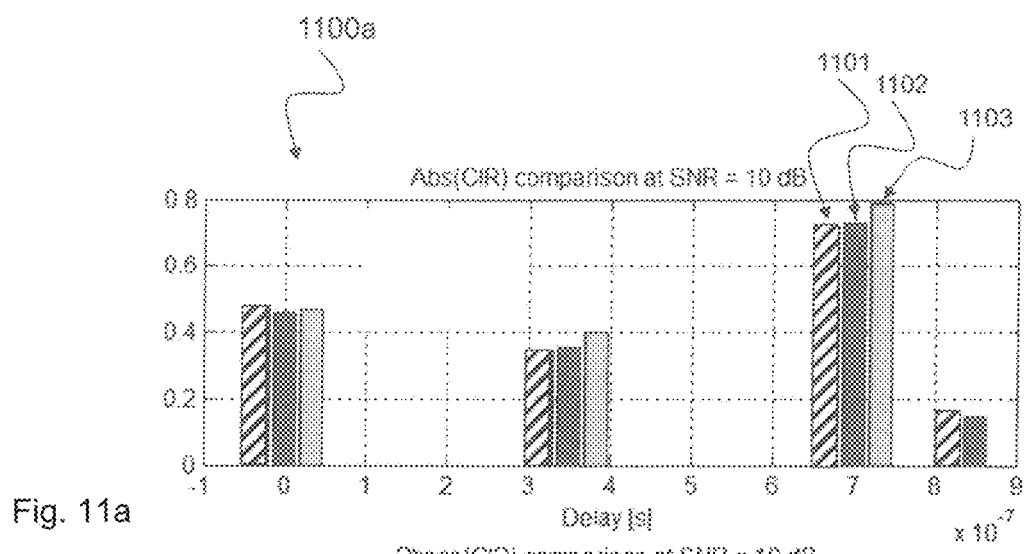
FIGS. 11a and 11b are performance diagrams illustrating absolute value (FIG. 11a) and phase (FIG. 11b) of estimated channel impulse response (CIR) over time of an MF channel estimation technique in accordance with the disclosure in comparison with an ICI unaware channel estimation technique.
Figure 11B:
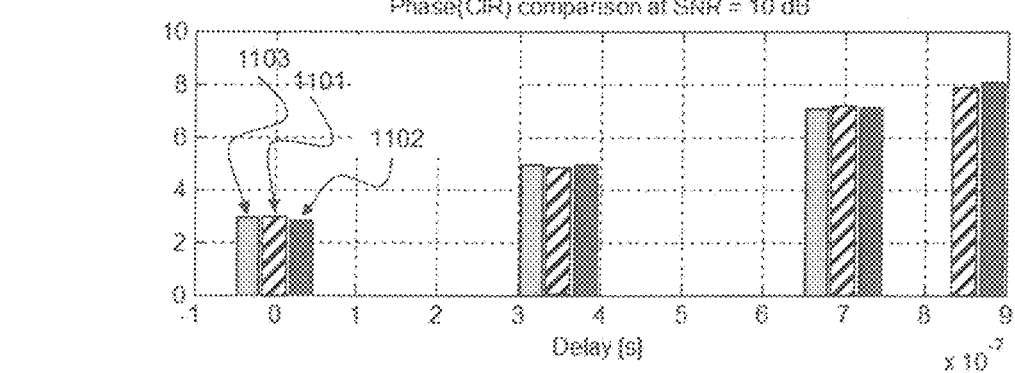

FIGS. 11a and 11b are performance diagrams illustrating absolute value 1100a (FIG. 11a) and phase 1100b (FIG. 11b) of estimated channel impulse response (CIR) over time of an MF channel estimation technique 1101 in accordance with the disclosure in comparison with an ICI unaware channel estimation technique 1103. FIGS. 11a and 11b capture one snapshot of the estimated channel impulse response, i.e. the CIR envelope and phase of MF 1101, SBL 1103 and the original channel 1102.

Figure 12:
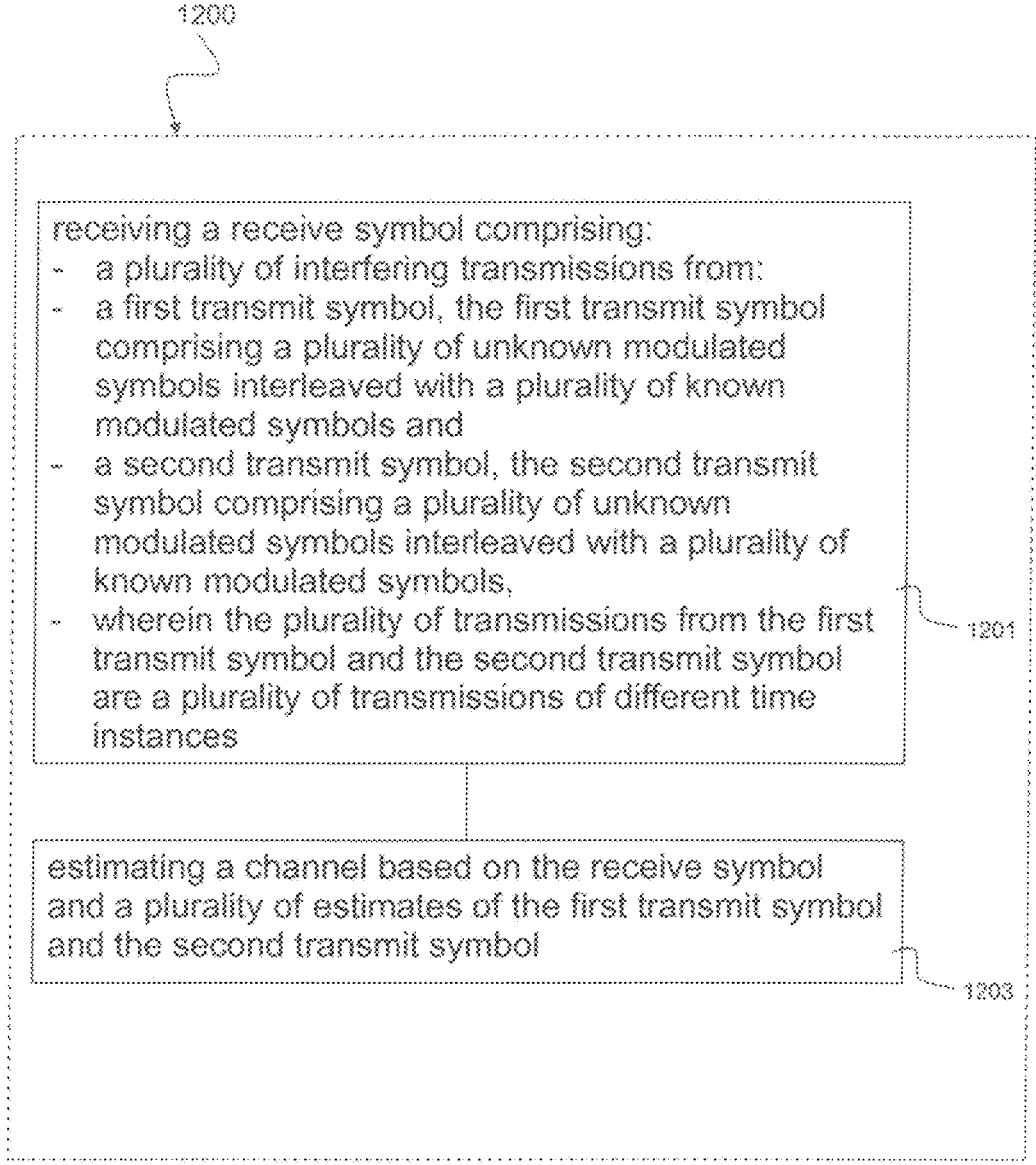
FIG. 12 is a schematic diagram of a method 1200 for channel estimation in accordance with the disclosure.

FIG. 12 is a schematic diagram of a method 1200 for channel estimation in accordance with the disclosure. The method 1200 comprises receiving 1201 a receive symbol comprising: a plurality of interfering transmissions from: a first transmit symbol, the first transmit symbol comprising a plurality of unknown modulated symbols interleaved with a plurality of known modulated symbols and a second transmit symbol, the second transmit symbol comprising a plurality of unknown modulated symbols interleaved with a plurality of known modulated symbols, wherein the plurality of transmissions from the first transmit symbol and the second transmit symbol are a plurality of transmissions of different time instances. A transmit symbol may be an array of unknown modulated symbols such as data intended for the receiver interleaved with an array of known modulated symbols such as pilots or reference symbols, e.g. cell-specific reference symbols (CRS) of an LTE frame. The method 1200 further comprises estimating 1203 a channel based on the receive symbol and a plurality of estimates of the first transmit symbol and the second transmit symbol.

The receiving 1201 may correspond to the receiving 201 of the method 200 described above with respect to FIG. 2. The estimating 1203 may correspond to the estimating 203 of the method 200 described above with respect to FIG. 2. The receive symbol may correspond to the receive symbol $y_n$ 206 described above with respect to FIGS. 2-7. The first transmit symbol may correspond to the first transmit symbol $x_n$ 202 described above with respect to FIGS. 2-7. The second transmit symbol may correspond to the second transmit symbol $x_{n-1}$ 204 described above with respect to FIGS. 2-7. The channel may correspond to the channel $g(\tau)$ 210 described above with respect to FIGS. 2-7.

EXAMPLES

The following examples pertain to further embodiments. Example 1 is a method for channel estimation, the method comprising: receiving a receive symbol comprising a plurality of interfering transmissions from a first transmit symbol, the first transmit symbol comprising a plurality of unknown modulated symbols interleaved with a plurality of known modulated symbols and a second transmit symbol, the second transmit symbol comprising a plurality of unknown modulated symbols interleaved with a plurality of known modulated symbols, wherein the plurality of transmissions from the first transmit symbol and the second transmit symbol are a plurality of transmissions of different time instances; and estimating a channel based on the receive symbol ($y_n$) and a plurality of estimates of the first transmit symbol and the second transmit symbol.

In Example 2, the subject matter of Example 1 can optionally include that the receive symbol comprises at least one of inter-symbol interference and inter-carrier interference from the transmission of the first transmit symbol and the transmission of the second transmit symbol.

In Example 3, the subject matter of any one of Examples 1-2 can optionally include equalizing the receive symbol by using the estimated channel.

In Example 4, the subject matter of any one of Examples 1-3 can optionally include that the plurality of transmissions from the first transmit symbol and the second transmit symbol are a plurality of transmissions of subsequent time instances.

In Example 5, the subject matter of any one of Examples 1-4 can optionally include that the first transmit symbol and the second transmit symbol comprise OFDM symbols.

In Example 6, the subject matter of Example 5 can optionally include that a duration of a cyclic prefix of the OFDM symbols is shorter than a delay of the channel.

In Example 7, the subject matter of any one of Examples 1-6 can optionally include that estimating the channel is based on time-domain data-aided channel estimation.

In Example 8, the subject matter of any one of Examples 1-7 can optionally include that estimating the channel is based on a signal representation comprising a dictionary matrix, wherein the dictionary matrix comprises the first transmit symbol and the second transmit symbol.

In Example 9, the subject matter of Example 8 can optionally include that the signal representation is based on a sparse channel model having only a few non-negligible multi-path components.

In Example 10, the subject matter of any one of Examples 8-9 can optionally include that the signal representation is based on probabilistic modeling of the channel and noise.

In Example 11, the subject matter of any one of Examples 8-10 can optionally include that the signal representation is according to: $y_n = A_{n,n-1}\beta + \epsilon_n$, where $y_n$ denotes the receive symbol at time instance n, $A_{n,n-1}$ denotes the dictionary matrix, $\beta$ denotes time-domain weights of the channel and $\epsilon_n$ denotes a noise power.

In Example 12, the subject matter of any one of Examples 8-11 can optionally include jointly estimating the channel and the first and second transmit symbols by applying the signal representation.

In Example 13, the subject matter of Example 12 can optionally include that jointly estimating the channel and the first and second transmit symbols is based on a mean field belief propagation framework.

Example 14 is a processing circuit, comprising: a receiving port configured to receive a receive symbol comprising a plurality of interfering transmissions from a first transmit symbol, the first transmit symbol comprising a plurality of unknown modulated symbols interleaved with a plurality of known modulated symbols and a second transmit symbol, the second transmit symbol comprising a plurality of unknown modulated symbols interleaved with a plurality of known modulated symbols, wherein the plurality of transmissions from the first transmit symbol and the second transmit symbol are a plurality of transmissions of different time instances; and a channel estimator configured to estimate a channel based on the receive symbol and a plurality of estimates of the first transmit symbol and the second transmit symbol.

In Example 15, the subject matter of Example 14 can optionally include that the receive symbol comprises an OFDM symbol.

In Example 16, the subject matter of any one of Examples 14-15 can optionally include a pre-processing unit configured to remove a cyclic prefix and to apply a Fourier transform to the receive symbol.

In Example 17, the subject matter of any one of Examples 14-16 can optionally include an equalizer configured to equalize the receive symbol by using the estimated channel.

In Example 18, the subject matter of any one of Examples 14-17 can optionally include that the channel estimator is configured to compute soft estimates of the channel and soft estimates of a noise variance based on a Bayesian inference technique.

In Example 19, the subject matter of Example 18 can optionally include that the equalizer is configured to compute soft estimates of the first transmit symbol and the second transmit symbol based on the soft estimates of the channel and the noise variance.

In Example 20, the subject matter of any one of Examples 14-19 can optionally include that the channel estimator is configured to estimate the channel based on a signal representation comprising a dictionary matrix, wherein the dictionary matrix comprises the first transmit symbol and the second transmit symbol.

In Example 21, the subject matter of Example 20 can optionally include that the channel estimator is configured to compute the dictionary matrix based on the estimates of the first transmit symbol and the second transmit symbol.

Example 22 is an OFDM receiver, comprising: a receiving port configured to receive a receive OFDM symbol comprising: interfering transmissions from a first OFDM symbol, the first OFDM symbol comprising a plurality of unknown modulated symbols interleaved with a plurality of known modulated symbols and a second OFDM symbol, the second OFDM symbol comprising a plurality of unknown modulated symbols interleaved with a plurality of known modulated symbols, wherein the plurality of transmissions from the first OFDM symbol and the second OFDM symbol are a plurality of transmissions of different time instances; a channel estimator configured to estimate a plurality of soft estimates of a channel impulse response and of a noise power based on the receive OFDM symbol and based on a plurality of soft estimates of the first OFDM symbol and the second OFDM symbol; an equalizer configured to estimate the plurality of soft estimates of the first OFDM symbol and the second OFDM symbol based on the plurality of soft estimates of the channel impulse response and the noise power estimated by the channel estimator.

In Example 23, the subject matter of Example 22 can optionally include that the channel estimator is configured to estimate the plurality of soft estimates of the channel based on a signal representation comprising a dictionary matrix, wherein the dictionary matrix comprises the first OFDM symbol and the second OFDM symbol.

In Example 24, the subject matter of Example 23 can optionally include that the signal representation is according to: $y_n = A_{n,n-1}\beta + \epsilon_n$, where $y_n$ denotes the receive symbol at time instance n, $A_{n,n-1}$ denotes the dictionary matrix, $\beta$ denotes soft estimates of the time-domain weights of the channel and $\epsilon_n$ denotes a soft estimate of a noise power.

In Example 25, the subject matter of any one of Examples 22-24 can optionally include that the equalizer is configured to estimate a first matrix representing an estimated impulse response of the channel, a second matrix representing an estimated inter-symbol interference and a third matrix representing an estimated inter-carrier interference.

Example 26 is a computer readable medium on which computer instructions are stored which when executed by a computer, cause the computer to perform the method of one of Examples 1 to 13.

Example 27 is a channel estimator, comprising: receiving means for receiving a receive symbol comprising: a plurality of interfering transmissions from a first transmit symbol, the first transmit symbol comprising a plurality of unknown modulated symbols interleaved with a plurality of known modulated symbols and a second transmit symbol, the second transmit symbol comprising a plurality of unknown modulated symbols interleaved with a plurality of known modulated symbols, wherein the plurality of transmissions from the first transmit symbol and the second transmit symbol are a plurality of transmissions of different time instances; and estimating means for estimating a channel based on the receive symbol ($y_n$) and a plurality of estimates of the first transmit symbol and the second transmit symbol.

In Example 28, the subject matter of Example 27 can optionally include that the receive symbol comprises at least one of inter-symbol interference and inter-carrier interference from the transmission of the first transmit symbol and the transmission of the second transmit symbol.

In Example 29, the subject matter of any one of Examples 27-28 can optionally include equalizing means for equalizing the receive symbol by using the estimated channel.

In Example 30, the subject matter of any one of Examples 27-29 can optionally include that the plurality of transmissions from the first transmit symbol and the second transmit symbol are a plurality of transmissions of subsequent time instances.

In Example 31, the subject matter of any one of Examples 27-30 can optionally include that the first transmit symbol and the second transmit symbol comprise OFDM symbols.

In Example 32, the subject matter of Example 30 can optionally include that a duration of a cyclic prefix of the OFDM symbols is shorter than a delay of the channel.

In Example 33, the subject matter of any one of Examples 27-32 can optionally include that the estimating means is configured to estimate the channel based on time-domain data-aided channel estimation.

In Example 34, the subject matter of any one of Examples 27-33 can optionally include that the estimating means is configured to estimate the channel based on a signal representation comprising a dictionary matrix, wherein the dictionary matrix comprises the first transmit symbol and the second transmit symbol.

In Example 35, the subject matter of Example 34 can optionally include that the signal representation is based on a sparse channel model having only a few non-negligible multi-path components.

In Example 36, the subject matter of any one of Examples 34-35 can optionally include that the signal representation is based on probabilistic modeling of the channel and noise.

In Example 37, the subject matter of any one of Examples 34-36 can optionally include that the signal representation is according to: $y_n = A_{n,n-1}\beta + \epsilon_n$, where $y_n$ denotes the receive symbol at time instance n, $A_{n,n-1}$ denotes the dictionary matrix, $\beta$ denotes time-domain weights of the channel and $\epsilon_n$ denotes a noise power.

In Example 38, the subject matter of any one of Examples 34-37 can optionally include jointly estimating means for jointly estimating the channel and the first and second transmit symbols by applying the signal representation.

In Example 39, the subject matter of Example 38 can optionally include that the jointly estimating means is configured to jointly estimate the channel and the first and second transmit symbols based on a mean field belief propagation framework.

Example 40 is a transmission system, comprising: an OFDM transmitter and an OFDM receiver according to any one of Examples 22-25.

In Example 41, the subject matter of Example 40 can optionally include a reception chain for processing the OFDM receive symbol received at the receive port in response to an OFDM transmit symbol transmitted at the OFDM transmitter.

In Example 42, the subject matter of Example 41 can optionally include that the OFDM receive symbol comprise the first OFDM symbol and the second OFDM symbol.

In Example 43, the subject matter of any one of Examples 40-42 can optionally include that the channel estimator comprises an IDFT transformer for transforming the OFDM receive symbol and a CP removing unit for removing a cyclic prefix from the OFDM receive symbol.

In Example 44, the subject matter of any one of Examples 40-43 can optionally include that the equalizer comprises a demodulator, deinterleaver and decoder unit 511 configured to provide LLR values of a first raw bit stream as generated by the OFDM transmitter at a first time instance and of a second raw bit stream as generated by the OFDM transmitter at a second time instance.

In Example 45, the subject matter of Example 44 can optionally include that the demodulator, deinterleaver and decoder unit is configured to provide LLR values of a first concatenated symbol as generated by the OFDM transmitter at the first time instance and of a second concatenated symbol as generated by the OFDM transmitter at a second time instance.

In Example 46, the subject matter of any one of Examples 40-45 can optionally include that the equalizer comprises a soft encoder and soft mapper unit configured to provide the estimates of the first OFDM symbol and the second OFDM symbol.

In Example 47, the subject matter of Example 46 can optionally include that the soft encoder and soft mapper unit is configured to provide the estimates of the first OFDM symbol and the second OFDM symbol based on the LLR values of the first and second concatenated symbols of Example 45.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A method for channel estimation, the method comprising:
receiving a receive symbol comprising:
a plurality of interfering transmissions from:
a first transmit symbol, the first transmit symbol comprising a plurality of unknown modulated symbols interleaved with a plurality of known modulated symbols; and
a second transmit symbol, the second transmit symbol comprising a plurality of unknown modulated symbols interleaved with a plurality of known modulated symbols,
wherein the plurality of interfering transmissions from the first transmit symbol and the second transmit symbol are a plurality of transmissions of different time instances; and
estimating a channel based on the receive symbol and a plurality of estimates of the first transmit symbol and the second transmit symbol, wherein estimating the channel is based on a signal representation comprising a dictionary matrix, wherein the dictionary matrix comprises the first transmit symbol and the second transmit symbol, and the estimating comprises jointly estimating the channel and the first and second transmit symbols by applying the signal representation.

2. The method of claim 1,
wherein the receive symbol comprises at least one of inter-symbol interference and inter-carrier interference from the plurality of transmissions of the first transmit symbol and the transmission of the second transmit symbol.

3. The method of claim 1, further comprising:
equalizing the receive symbol by using the estimated channel.

4. The method of claim 1,
wherein the plurality of transmissions from the first transmit symbol and the second transmit symbol are a plurality of transmissions of subsequent time instances.

5. The method of claim 1,
wherein the first transmit symbol and the second transmit symbol comprise OFDM symbols.

6. The method of claim 5,
wherein a duration of a cyclic prefix of the OFDM symbols is shorter than a delay of the channel.

7. The method of claim 1,
wherein estimating the channel is based on time-domain data-aided channel estimation.

8. The method of claim 1,
wherein the signal representation is based on a sparse channel model having only a few non-negligible multipath components.

9. The method of claim 8,
wherein the signal representation is based on probabilistic modeling of the channel and noise.

10. The method of claim 1, wherein the signal representation is according to:

$$y_n = A_{n,n-1}\beta + \epsilon_n,$$

where $y_n$ denotes the receive symbol at time instance n, $A_{n,n-1}$ denotes the dictionary matrix, $\beta$ denotes time-domain weights of the channel and $\epsilon_n$ denotes a noise power.

11. The method of claim 1,
wherein jointly estimating the channel and the first and second transmit symbols is based on a mean field belief propagation framework.

12. A processing circuit, comprising:
a receiving port configured to receive a receive symbol comprising:
a plurality of interfering transmissions from:
a first transmit symbol, the first transmit symbol comprising a plurality of unknown modulated symbols interleaved with a plurality of known modulated symbols; and
a second transmit symbol, the second transmit symbol comprising a plurality of unknown modulated symbols interleaved with a plurality of known modulated symbols,
wherein the plurality of interfering transmissions from the first transmit symbol and the second transmit symbol are a plurality of transmissions of different time instances; and
a channel estimator configured to estimate a channel based on the receive symbol and a plurality of estimates of the first transmit symbol and the second transmit symbol, wherein the channel estimator is configured to estimate the channel based on a signal representation comprising a dictionary matrix, wherein the dictionary matrix comprises the first transmit symbol and the second transmit symbol, and the estimating comprises jointly estimating the channel and the first and second transmit symbols by applying the signal representation.

13. The processing circuit of claim 12, wherein the receive symbol comprises an OFDM symbol.

14. The processing circuit of claim 12, comprising:
a pre-processing unit configured to remove a cyclic prefix and to apply a Fourier transform to the receive symbol.

15. The processing circuit of claim 12, comprising:
an equalizer configured to equalize the receive symbol by using the estimated channel.

16. The processing circuit of claim 12,
wherein the channel estimator is configured to compute soft estimates of the channel and soft estimates of a noise variance based on a Bayesian interference technique.

17. The processing circuit of claim 16, wherein the equalizer is configured to compute soft estimates of the first transmit symbol and the second transmit symbol based on the soft estimates of the channel and the noise variance.

18. The processing circuit of claim 12,
wherein the channel estimator is configured to compute the dictionary matrix based on the estimates of the first transmit symbol and the second transmit symbol.

19. An OFDM receiver, comprising:
a receiving port configured to receive a receive OFDM symbol comprising:
 a plurality of interfering transmissions from a first OFDM symbol, the first OFDM symbol comprising a plurality of unknown modulated symbols interleaved with a plurality of known modulated symbols; and
 a second OFDM symbol, the second OFDM symbol comprising a plurality of unknown modulated symbols interleaved with a plurality of known modulated symbols,
wherein the plurality of interfering transmissions from the first OFDM symbol and the second OFDM symbol are a plurality of transmissions of different time instances;
a channel estimator configured to estimate a plurality of soft estimates of a channel impulse response and of a noise power based on the receive OFDM symbol and based on a plurality of soft estimates of the first OFDM symbol and the second OFDM symbol, wherein the channel estimator is configured to estimate the plurality of soft estimates of the channel based on a signal representation comprising a dictionary matrix, wherein the dictionary matrix comprises the first OFDM symbol and the second OFDM symbol, and the estimating comprises jointly estimating the channel and the first and second transmit symbols by applying the signal representation; and
an equalizer configured to estimate the plurality of soft estimates of the first OFDM symbol and the second OFDM symbol based on the plurality of soft estimates of the channel impulse response and the noise power estimated by the channel estimator.

20. The OFDM receiver of claim 19,
wherein the signal representation is according to:

$$y_n = A_{n,n-1}\beta + \epsilon_n,$$

where $y_n$ denotes the receive symbol at time instance n, $A_{n,n-1}$ denotes the dictionary matrix, $\beta$ denotes soft estimates of the time-domain weights of the channel and $\epsilon_n$ denotes a soft estimate of a noise power.

21. The OFDM receiver of claim 19,
wherein the equalizer is configured to estimate a first matrix representing an estimated impulse response of the channel, a second matrix representing an estimated inter-symbol interference and a third matrix representing an estimated inter-carrier interference.

\* \* \* \* \*